(12) United States Patent
Lewis et al.

(10) Patent No.: US 10,343,089 B2
(45) Date of Patent: Jul. 9, 2019

(54) LIQUID REFINEMENT

(71) Applicant: Recovered Energy, Inc., Pocatello, ID (US)

(72) Inventors: Richard Lewis, Pocatello, ID (US); Kurt Scott, Blackfoot, ID (US)

(73) Assignee: RECOVERED ENERGY, INC., Pocatello, ID (US)

( * ) Notice: Subject to any disclaimer, the term of this patent is extended or adjusted under 35 U.S.C. 154(b) by 0 days.

(21) Appl. No.: 15/728,490

(22) Filed: Oct. 9, 2017

(65) Prior Publication Data

US 2018/0028942 A1 Feb. 1, 2018

Related U.S. Application Data

(63) Continuation-in-part of application No. 15/055,478, filed on Feb. 26, 2016, now Pat. No. 9,782,697.

(Continued)

(51) Int. Cl.
*B01D 21/02* (2006.01)
*B01D 17/028* (2006.01)
(Continued)

(52) U.S. Cl.
CPC ...... *B01D 21/0087* (2013.01); *B01D 17/0211* (2013.01); *B01D 21/003* (2013.01);
(Continued)

(58) Field of Classification Search
CPC ............ B01D 17/0211; B01D 17/0214; B01D 21/0009; B01D 21/003; B01D 21/0042;
(Continued)

(56) References Cited

U.S. PATENT DOCUMENTS

1,427,446 A * 8/1922 Denoel ............. B01D 21/2405
210/534
3,311,296 A 3/1967 Torobin
(Continued)

FOREIGN PATENT DOCUMENTS

DE 3540606 5/1987
EP 2143473 1/2010
(Continued)

OTHER PUBLICATIONS

Hydroscreen Static Screen: Liquid and solid separation, brochure by Parkson, pp. 1-2.
(Continued)

*Primary Examiner* — Christopher Upton
(74) *Attorney, Agent, or Firm* — Kunzler Bean & Adamson

(57) ABSTRACT

Embodiments disclosed herein relate to an apparatus for refining a liquid stream. The apparatus includes a first flow chamber, an inclined plate region, and a second flow chamber. The first flow chamber forms a first portion of an hourglass double cone structure and directs the liquid stream in a first direction at a first velocity. The inclined plate region includes inclined plates radiating outward from the hourglass double cone structure in a helical pattern. The inclined plate region directs the liquid carrier in a second direction opposite the first direction at a second velocity less than the first velocity forming a laminar flow condition in the liquid stream to separate heavy waste and light waste from the liquid stream. The second flow chamber forms a second portion of the hourglass double cone structure and directs the liquid stream to a liquid stream outlet.

20 Claims, 24 Drawing Sheets

Related U.S. Application Data

(60) Provisional application No. 62/121,660, filed on Feb. 27, 2015, provisional application No. 62/121,673, filed on Feb. 27, 2015, provisional application No. 62/204,327, filed on Aug. 12, 2015.

(51) Int. Cl.
*B01D 21/00* (2006.01)
*B01D 17/02* (2006.01)
*B01D 21/24* (2006.01)

(52) U.S. Cl.
CPC ..... *B01D 21/0003* (2013.01); *B01D 21/0009* (2013.01); *B01D 21/0045* (2013.01); *B01D 21/0048* (2013.01); *B01D 21/0054* (2013.01); *B01D 21/10* (2013.01); *B01D 21/2405* (2013.01); *B01D 21/0042* (2013.01)

(58) Field of Classification Search
CPC ............ B01D 21/0045; B01D 21/0054; B01D 21/0087; B01D 21/2405; B01D 21/2444; B01D 21/283
USPC ......... 210/801, 2, 519, 521, 522, 532.1, 540
See application file for complete search history.

(56) References Cited

U.S. PATENT DOCUMENTS

| | | | |
|---|---|---|---|
| 3,666,112 A | 5/1972 | Pielkenrood et al. | |
| 3,791,105 A | 2/1974 | Rhodes | |
| 3,903,000 A * | 9/1975 | Miura ................. | B01D 21/283 210/521 |
| 3,915,858 A | 10/1975 | Condolios | |
| 4,263,137 A | 4/1981 | Kos | |
| 4,271,017 A | 6/1981 | Milgram | |
| 4,469,582 A | 9/1984 | Sublette | |
| 4,559,141 A | 12/1985 | Gyulavari | |
| 4,889,624 A | 12/1989 | Soriente et al. | |
| 5,549,827 A | 8/1996 | Batson | |
| 5,720,705 A | 2/1998 | Inge et al. | |
| 6,315,898 B1 | 11/2001 | Bull | |
| 7,850,860 B2 | 12/2010 | Dissinger et al. | |
| 8,603,343 B2 | 12/2013 | Viguie et al. | |
| 8,945,401 B2 | 2/2015 | Cook et al. | |
| 9,782,697 B2 * | 10/2017 | Lewis ................ | B01D 21/2405 |
| 9,782,698 B2 | 10/2017 | Lewis et al. | |
| 9,782,699 B2 | 10/2017 | Lewis et al. | |
| 2001/0042725 A1 | 11/2001 | Goodrich | |
| 2002/0000408 A1 | 1/2002 | Koreis et al. | |
| 2004/0025961 A1 | 2/2004 | Beaulieu | |
| 2006/0054551 A1 | 3/2006 | Myers et al. | |
| 2010/0236409 A1 | 9/2010 | Cnossen | |
| 2011/0168641 A1 | 7/2011 | Boyd et al. | |
| 2011/0168643 A1 | 7/2011 | Streng et al. | |
| 2011/0186513 A1 | 8/2011 | Vuong et al. | |
| 2014/0374364 A1 | 12/2014 | Spiess | |
| 2018/0028941 A1 | 2/2018 | Lewis et al. | |

FOREIGN PATENT DOCUMENTS

| | | |
|---|---|---|
| FR | 1081214 | 12/1954 |
| FR | 2711072 | 4/1995 |
| GB | 386312 | 1/1933 |
| GB | 897255 | 5/1962 |
| GB | 925993 | 5/1963 |
| GB | 1351801 | 5/1974 |
| GB | 1352083 | 5/1974 |
| WO | 9010597 | 9/1990 |

OTHER PUBLICATIONS

Slant Rib Coalescing Oil/Water Separator: For minimum space and maximum separation efficiency, brochure by Parkson, pp. 1-2.
International Search Report and Written Opinion for International Application No. PCT/US2016/019958 dated Jun. 24, 2016.
Partial European Search Report and Provisional Opinion concerning EP Patent Application No. EP16756527.4 dated Oct. 26, 2018.

* cited by examiner

LIQUID REFINEMENT

CROSS-REFERENCE TO RELATED APPLICATIONS

This application is a continuation-in-part of U.S. patent application Ser. No. 15/055,478, filed Feb. 26, 2016, which claims the benefit of U.S. Provisional Patent Application Nos. 62/121,660 and 62/121,673, filed Feb. 27, 2015, and U.S. Provisional Patent Application No. 62/204,327, filed on Aug. 12, 2015, which are all incorporated herein by reference.

FIELD

The present disclosure relates to liquid refinement, and more particularly relates to removing solids and liquids from a liquid stream.

BACKGROUND

Liquid refinement is an important process for many different industries. For example, waste water treatment facilities, oil drilling operations, oil well produced water processes, fossil fuel refineries, power stations, food processing plants, mining operations, petrochemical plants, and agricultural operations, among others, all utilize mechanisms or systems for separating liquids from other components (e.g., contaminants, pollutants, solid particles, other liquids, etc.). Most conventional separators utilize active features (e.g., powered elements, agitators, vibrating screens, etc.), chemical reactions, filters, and/or gravity to accomplish the desired separation. The separation technologies that employ active features, filter media and/or chemical reactions can be expensive and complicated to operate and maintain. Conventional technologies that rely exclusively on gravity are either too inefficient or are unable to achieve the requisite level of separation.

SUMMARY

From the foregoing discussion, it should be apparent that a need exists for an apparatus, system, and method for refining a liquid stream that overcome the limitations of conventional liquid separators. Beneficially, such an apparatus, system, and method would provide a faster, more complete, and higher level of separation than conventional gravity separators, thus improving the ease, efficiency, and effectiveness of removing components from a liquid stream.

The subject matter of the present application has been developed in response to the present state of the art, and in particular, in response to the problems and needs in the art that have not yet been fully solved by currently available liquid separators. For example, the ease, efficiency, and effectiveness of refining a liquid stream could be improved by flowing the liquid stream across inclined plates while slowing and redirecting the liquid stream. Accordingly, the present disclosure has been developed to provide apparatuses, systems, and methods for refining a liquid stream that overcome many or all of the above-discussed shortcomings in the art.

Disclosed herein, according to one embodiment, is an apparatus for refining a liquid stream. The apparatus includes a first a first flow chamber of an hourglass double cone structure. The first flow chamber is shaped to direct the liquid stream gravitationally downward in a first direction at a first velocity. The liquid stream includes a liquid carrier with at least one of a heavy waste having a specific gravity greater than a specific gravity of the liquid carrier and a light waste having a specific gravity less than the specific gravity of the liquid carrier. The apparatus also includes an inclined plate region disposed on an exterior of the hourglass double cone structure. The inclined plate region includes inclined plates having a geometry radiating outward from the hourglass double cone structure in a helical pattern. The geometry of the inclined plate region directs the liquid carrier upwards in a second direction opposite the first direction at a second velocity less than the first velocity forming a laminar flow condition in the liquid stream to separate the heavy waste to a lower collection portion and the light waste to an upper collection portion of the apparatus. The apparatus also includes a second flow chamber of the hourglass double cone structure, the second flow chamber shaped to direct the liquid stream to a liquid stream outlet.

According to one implementation, the inclined plates define inclined channels fluidly coupling an outlet of the first flow chamber and an inlet of the second flow chamber. The liquid carrier flows into the inclined channels in a third direction perpendicular to the first and second directions and out of the inclined channels in a fourth direction opposite the third direction. For example, the third direction may be radially outward and the fourth direction may be radially inward. In one embodiment, the inclined plates are circumferentially spaced apart in an annular formation and the annular formation of the inclined plates is positioned proximate, and substantially concentric with, an outlet of the first flow chamber and an inlet of the second flow chamber.

In another implementation, the liquid stream does not require the use of flocculants to achieve refinement. In one implementation, the slope of at least one of the first flow chamber and the second flow chamber relative to the horizontal is between about 45 to 70 degrees. In another implementation, the slope of the inclined plates is between about 20 degrees and about 70 degrees.

In another implementation, the plates have a geometry to apply a raking effect to push waste radially outward on the plates. In one implementation, the inclined plates are electrostatically charged. The apparatus may include a motivating device. In some implementations, a cross-sectional area of the inclined plate region is larger than a cross-sectional area of the first flow chamber. The first velocity may range from about 1.5 to about 3 times more than the second velocity as the liquid fluid goes through the plate pack.

In some implementations, the first flow chamber, the inclined plate region, and the second flow chamber are free of moving parts. The first flow chamber, the inclined plate region, and the second flow chamber may be free of interchangeable media. In one implementation, a liquid stream supply line is oriented within the first flow chamber to direct the liquid stream gravitationally upward into the first flow chamber opposite the first direction.

Also disclosed herein is a method. The method includes directing a liquid stream in a first direction gravitationally downward at a first velocity through a first flow chamber of an hourglass double cone structure. The liquid stream includes a liquid carrier and one or more of a heavy waste and a light waste. The heavy waste has a specific gravity greater than a specific gravity of the liquid carrier and the light waste has a specific gravity less than the specific gravity of the liquid carrier. The method also includes directing the liquid stream from the first flow chamber into an inclined plate region disposed on an exterior of the hourglass double cone structure. The inclined plate region includes inclined plates having a geometry radiating outward from the exterior of the hourglass double cone structure in a helical pattern. The inclined plates form a laminar flow condition in the liquid stream in a second direction opposite the first direction at a second velocity less than the first velocity to separate the heavy waste and the light waste from the liquid carrier in the liquid stream and directing the liquid stream away from the first flow chamber. The method also includes directing the liquid carrier from the inclined plate region into a second flow chamber of the hourglass double cone structure. The second flow chamber is shaped to direct the liquid stream gravitationally downward to a liquid stream outlet. The method also includes collecting at least a portion of the heavy waste at a lower collection portion disposed gravitationally below the inclined plate region. The method also includes collecting at least a portion of the light waste at an upper collection portion disposed gravitationally above the inclined plate region.

In one implementation, the method further includes transitioning the liquid stream from the outlet of the first flow chamber to an inlet of the second flow chamber via inclined channels defined by the inclined plates. The liquid stream may transition from the first flow chamber to the inclined plate region by moving in a third direction and may transition from the inclined plate region to the second flow chamber by moving in a fourth direction.

In one implementation the inclined plate region is an annulus formed around and extending from the hourglass double cone structure. The third direction may be radially outward. The fourth direction may be radially inward.

Also disclosed is system for refining a liquid stream. The system includes a first flow chamber of an hourglass double cone structure. The first flow chamber is shaped opening downward to direct the liquid stream gravitationally downward in a first direction at a first velocity. The liquid stream includes a liquid carrier with at least one of a heavy waste having a specific gravity greater than a specific gravity of the liquid carrier and a light waste having a specific gravity less than the specific gravity of the liquid carrier. The system also includes an inclined plate region exterior to the hourglass double cone structure. The inclined plate region includes inclined plates having a geometry radiating outward from the hourglass double cone structure in a helical pattern. The geometry of the inclined plate region directs the liquid carrier upwards in a second direction opposite the first direction at a second velocity less than the first velocity forming a laminar flow condition in the liquid stream to separate the heavy waste to a lower collection portion and the light waste to an upper collection portion of the system. The system also includes a second flow chamber of the hourglass double cone structure. The second flow chamber opens upward and is shaped to direct the liquid stream to a liquid stream outlet. The second flow chamber is separated from the first flow chamber by a divider. The system also includes a heavy waste outlet to facilitate removal of the heavy waste from the lower collection portion of the system. The system also includes a light waste outlet to facilitate removal of the light waste from the upper collection portion of the system.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the subject matter disclosed herein. Thus, discussion of the features and advantages, and similar language, throughout this specification may, but do not necessarily, refer to the same embodiment.

Furthermore, the described features, advantages, and characteristics of the disclosure may be combined in any suitable manner in one or more embodiments. One skilled in the relevant art will recognize that the subject matter of the present application may be practiced without one or more of the specific features or advantages of a particular embodiment. In other instances, additional features and advantages may be recognized in certain embodiments that may not be present in all embodiments of the disclosure. Further, in some instances, well-known structures, materials, or operations are not shown or described in detail to avoid obscuring aspects of the subject matter of the present disclosure. These features and advantages of the present disclosure will become more fully apparent from the following description and appended claims, or may be learned by the practice of the disclosure as set forth hereinafter.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the subject matter of the present application will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

In the following description, numerous specific details are provided. One skilled in the relevant art will recognize, however, that the subject matter of the present application may be practiced without one or more of the specific details, or with other methods, components, materials, and so forth. In other instances, well-known structures, materials, or operations are not shown or described in detail to avoid obscuring aspects of the disclosure.

Illustrated in FIGS. 1-18 are several representative embodiments of an apparatus for refining a liquid stream and several representative embodiments of methods and systems of using the apparatus. More specifically, FIGS. 1-8 relate to an apparatus for removing solid particles from a liquid stream, FIGS. 9-12 relate to an apparatus for removing a lower-density liquid from a liquid stream, and FIGS. 13-18 relate to an apparatus for removing both solid particles and a lower-density liquid from a liquid stream.

As described herein, the apparatus for refining a liquid stream provides various advantages and benefits over other liquid separators and liquid separation procedures. However, the recited advantages are not meant to be limiting in any way, as one skilled in the art will appreciate that other advantages may also be realized upon practicing the present disclosure.

Figure 1:
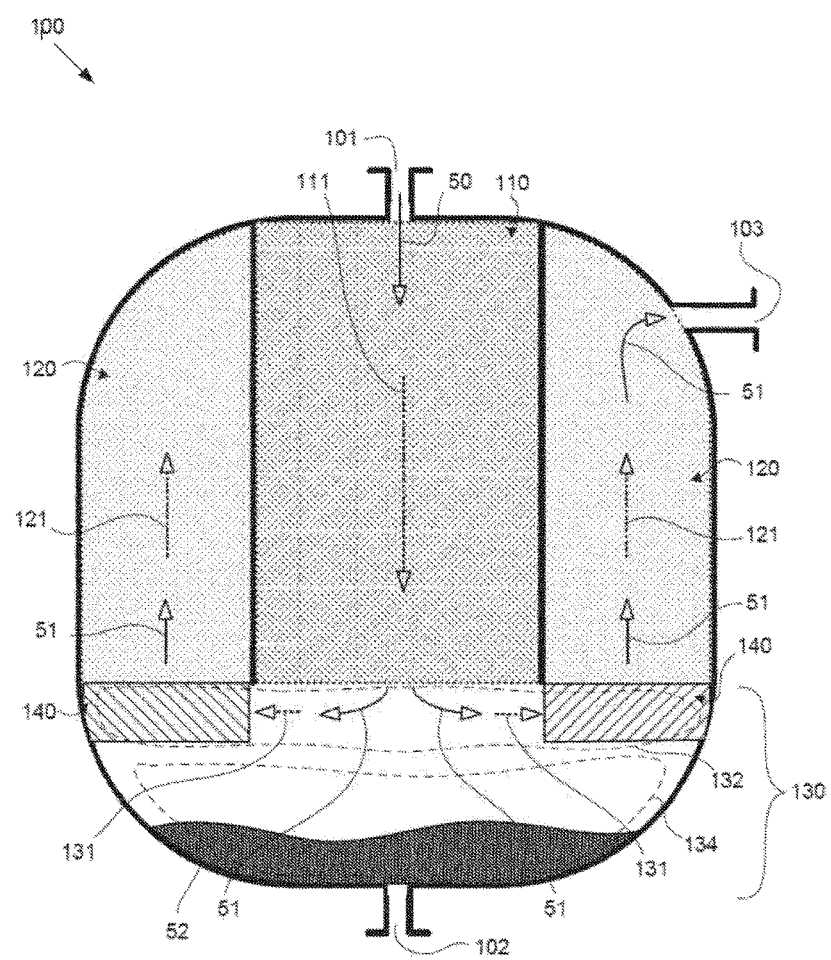
FIG. 1 is a schematic, cross-sectional view of an apparatus for removing solid particles from a liquid stream, according to one embodiment.

FIG. 1 is a schematic, cross-sectional view of an apparatus 100 for removing solid particles 52 from a liquid stream 50, according to one embodiment. As mentioned above, many industrial processes require, or at least would benefit from, the ability to efficiently and effectively refine a liquid stream in order to harvest/collect elements mixed therein and/or recycle the refined liquid. Accordingly, as used throughout the present disclosure, the term "liquid stream" 50 refers to a liquid carrier 51 having solid particles 52 (and/or other liquids, see below with reference to FIGS. 9-18) mixed into the liquid carrier 51; that is, the liquid carrier 51 is the principal constituent of the liquid stream 50 and is the medium in which the solid particles are mixed. The solid particles 52 may be suspended, dispersed, mixed, entrained, or otherwise combined with the liquid carrier 51. The solid particles 52 have a specific gravity that is greater than the specific gravity of the liquid carrier 51. The difference between the specific gravities of the liquid carrier 51 and the solid particles 52 is a major driving force of a successful separation. In other words, the specific gravity of the liquid carrier 51 contrasted with the specific gravity of the solid particles 52 yields potential energy which is exploited in order to accomplish the separation. In one embodiment, for example, the liquid carrier 51 is water and the solid particles 52 are sediment from a drilling process. While reference is repeatedly made throughout the disclosure to separating solid particles from the liquid carrier, the apparatus 100 may be employed to separate any substance from the liquid carrier that has a different from the specific gravity of the liquid carrier.

The apparatus 100 is configured to receive the liquid stream 50 through a liquid stream inlet 101 and to output collected solid particles 52 through a solids outlet 102 and a refined liquid carrier 51 through a liquid carrier outlet 103. The apparatus 100 has a first flow chamber 110, a second flow chamber 120, and a separation chamber 130 disposed between the first and second flow chambers 110, 120. The liquid stream 50 enters the first flow chamber 110 and flows in a first direction 111 at a first velocity. The first direction 111 is substantially parallel to gravity (i.e., downward) and the first velocity is greater than a settling velocity of the solid particles 52 in the liquid carrier 51. In other words, the downward speed of the liquid stream 50 in the first flow chamber 110 is greater than the speed of which the solid particles 52 would fall, due to gravity, through the liquid carrier 51. The settling velocity of specific solid particles 52 in a specific liquid carrier 51 can be calculated according to Stokes' law.

After passing through the first flow chamber 110, the liquid stream flows into the separation chamber 130. The separation chamber has two portions, a redirection portion 132 and a collection portion 134. In the redirection portion 132, the flow direction of the liquid carrier 51 transitions from the first direction 111 to a second direction 121 opposite the first direction 111. In other words, the liquid carrier 51 is redirected 180 degrees and flows upwards into the second flow chamber 120. During this redirection, the liquid carrier 51 also slows from the first velocity to a second velocity. That is, the first velocity is defined as the velocity of the liquid stream 50 just before undergoing the 180 redirection in the redirection portion 132 of the separation chamber 130 and the second velocity is the velocity of the liquid carrier 51 just after the 180-degree redirection (e.g., the velocity of the liquid carrier 51 entering the second flow chamber). The magnitude (i.e., speed) of the second velocity is less than the first velocity and is also less than the above discussed settling velocity of the solid particles 52 in the liquid carrier 51. Throughout the present disclosure, flow directions are depicted in the figures and described herein. These flow directions (e.g., the first flow direction 111 and the second flow direction 121) represent an average, overall direction of flow. In other words, the flow directions shown in the figures and described herein refer to macro level flow patterns. Accordingly, while the average or overall flow of liquid may be in the indicated direction, eddies and other forms of turbulence may cause irregularities or non-uniformities in the micro level flow of the liquid.

The speed decrease of the liquid carrier 51, together with the 180-degree redirection of the liquid carrier 51, contribute to the solid particles 52 settling out (e.g., 'falling out') of the liquid carrier 51 and collecting in the collection portion 134 of the separation chamber 130. Thus, the apparatus 100 utilizes flow direction (e.g., the first direction 111 is parallel to gravity), flow redirection (e.g., changing from the first direction 111 parallel to gravity to the second direction 121 opposite gravity), and a change in flow velocities (e.g., slowing from the first velocity to the second velocity) to maximize the efficiency of the gravity separation.

The cross-sectional flow area of the second flow chamber 120 can be larger than the cross-sectional flow area of the first flow chamber 110 to slow the liquid carrier 51 down to the second velocity (which is less than or equal to the settling velocity of the solid particles 52 in the liquid carrier 51). In one embodiment, the cross-sectional area of the second flow chamber 120 is between about 1.5 and about 3 times larger than the cross-sectional area of the first flow chamber 110. In one embodiment, the first velocity is about twice the second velocity. In one embodiment, the first velocity is such that flow of the liquid stream 50 in the first flow chamber 110 is turbulent. In another embodiment, the second velocity is such that flow of the liquid carrier 51 in the second flow chamber 120 is laminar. The relative cross-sectional sizes of the first and second flow chambers 110, 120 can vary from application to application depending on the type of liquid carrier 51, the type of solid particles 52, and the relative specific gravities of the liquid carrier 51 and the solid particles 52, among other factors.

In addition to the speed decrease and the 180 degree redirection, the separation chamber 130 of the apparatus 100 may also include a configuration of inclined plates 140 disposed in the fluid flow path starting at the end of the first flow chamber 110 and protruding some distance below flow chamber 110 into separation chamber 130 then continuing up through some portion of the second flow chamber 120 that can include anywhere from 10% of flow chamber 120 up to 90% of flow chamber 120, depending on the desired separation efficiency. That is, the inclined plates 140 define inclined channels 249 (see FIG. 5) through which the liquid carrier 51 must flow while slowing from the first velocity to the second velocity and while redirecting from the first direction 111 to the second direction 121. The entry into the inclined plates 140 can be straight into the plates or the inside edge of the inclined plates 140 can be bent to cause additional redirection of the liquid carrier. Gravity pulls solid particles down so that if they are large enough and heavy enough to overcome the directional flow of the liquid carrier 51 in a laminar flow condition they hit an inclined plate. Velocity at the surface of any given inclined plate 140 is negligible. Once a solid particle touches the surface of an inclined plate 140 the particle slides down the plate into separation chamber 130. Because of the circular shape of apparatus 100 the tilt and angle of the inclined plates 140 penetrating into separation chamber 130 draw or rake the particles down and toward the outside of the inclined plates 140. This raking affect helps remove the particles from the flow of the liquid carrier 51 and limits re-entrainment of particles. Any solid particles 52 that have yet to settle out of the liquid carrier 51 due to the slowing and redirecting are promoted to settle via exposure to the extensive surface area of the inclined plates 140. Additional details regarding the inclined plates 140 are included below with reference to FIGS. 4-6.

According to one embodiment, the liquid carrier 51 enters (e.g., flows into) the configuration of inclined plates 140 sideways. In other words, the liquid carrier 51, with any remaining solid particles that have yet to settle into the collection portion 134 of the separation chamber 130, flows into the configuration of inclined plates 140 in a third direction 131 that is substantially perpendicular to the first and second directions 111, 121. Once again, the significance of entering the inclined plates 140 in a sideways direction and other details relating to the inclined plates 140 are included below.

The two portions 132, 134 of the separation chamber 130 are not physically well-defined or sharply delineated. That is, these portions 132, 134 of the separation chamber 130 are separately referred to herein according to the predominant and distinct flow characteristics of the liquid carrier 51 and solid particles 52 in the respective portions 132, 134. The liquid carrier 51 predominantly redirects in the redirection portion 132 of the separation chamber 130 and the solid particles 52 predominantly collect in the collection portion 134 of the separation chamber 130. Thus, in one embodiment, the separation chamber 130 does not have any physical features or barriers that distinguish the two portions 132, 134 from each other. For this reason, the redirection portion 132 and the collection portion 134 have been depicted in FIG. 1 as somewhat amorphous shapes.

The solid particles 52 that settle into the collection portion 134 of the separation chamber 130 can be extracted from the apparatus 100 via a solids outlet 102. In one embodiment, the apparatus 100 can be configured to continuously remove settled-solid particles 52 from the separation chamber. In another embodiment, batch-removal of the solid particles 52 may be performed periodically or upon the determination that a certain amount (e.g., volume, mass, weight, etc.) of solid particles 52 has settled in the collection portion 134 of the separation chamber 130. The solid particles 52 may be flushed, pumped, screwed, or suctioned out, among other methods, via the solids outlet 102.

In one embodiment, the apparatus 100 is free of (i.e., does not include) any flow-affecting moving parts. For example, in one embodiment the apparatus 100 does not have any agitators or vibrating elements to promote separation. In one embodiment, the apparatus 100 does not include any type of flocculation subsystem. While flocculation subsystems may be beneficial and may be included in certain embodiments, such as in applications in which the liquid carrier 51 and the solid particles 52 form a substantially stable colloidal suspension, the above discussed separation efficiency of the apparatus 100 may be sufficient to achieve a desired separation level without needing flocculation subsystems or any kind of interchangeable media. For example, the apparatus 100, without flow-affecting moving parts, flocculation subsystems, or interchangeable media, may be able to remove solid particles down to particle sizes ranging from about 1 micron to about 50 microns. In another embodiment, the apparatus 100, without flow-affecting moving parts, flocculation subsystems, or interchangeable media, may be able to remove solid particles down to less than 25-micron particle size. While such a result is dependent on the difference between the specific gravities of the carrier fluid 51 and the solid 52, such particle size separation range is generally expected when using the apparatus 100.

The second flow chamber 120 directs the liquid carrier 51, which is substantially free of solid particles down to a certain size, upwards in the second direction 121, continuing up through the inclined plates 140. The liquid carrier 51 can then flow out of the apparatus 100 via a refined liquid carrier outlet 103, located in the side or top of apparatus 100 or could flow over a weir. In one embodiment, the apparatus 100 is cylindrical and flow chamber 120 forms an annulus around flow chamber 110. For example, the first flow chamber 110 may be a central channel and the second flow chamber 120 may be an annular channel that surrounds and is concentric with the first flow chamber 110. In another embodiment, the apparatus 100 is cylindrical and flow chamber 110 is cone shaped, with flow chamber 120 forming an annulus around the conical flow chamber 110. In either embodiment, the third direction 131 (i.e., the direction of the flow of the carrier fluid 51 into the configuration of inclined plates 140) is radially outward.

Figure 2:
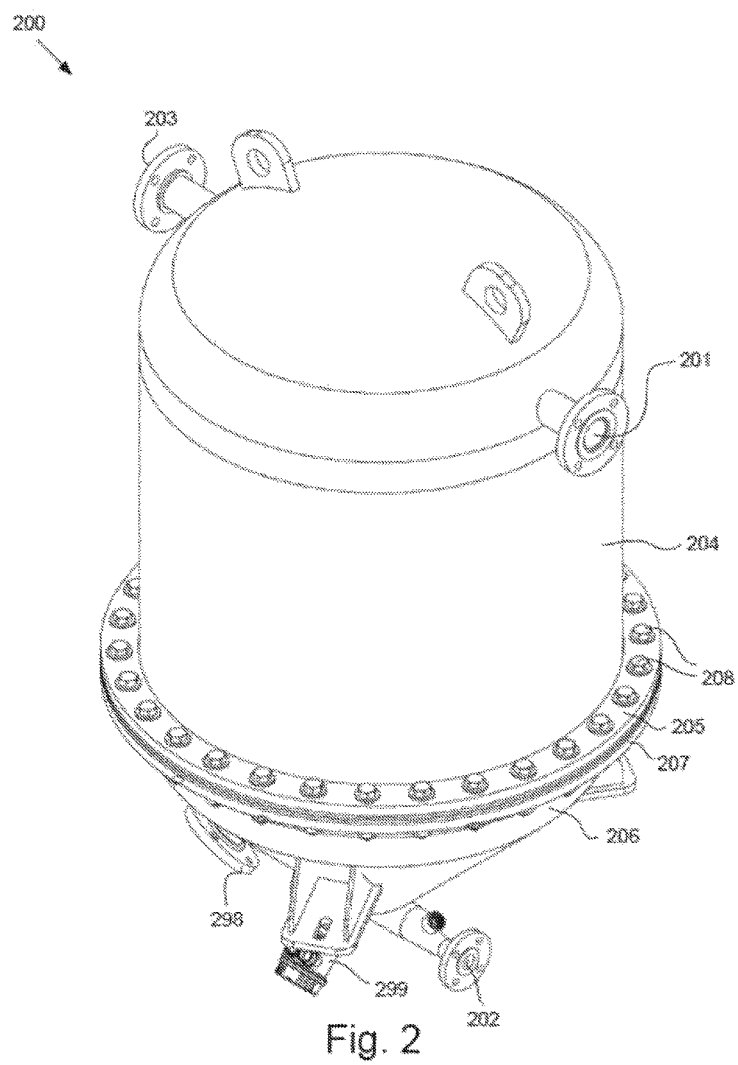
FIG. 2 is a perspective view of an apparatus for removing solid particles from a liquid stream, according to one embodiment.
Figure 3:
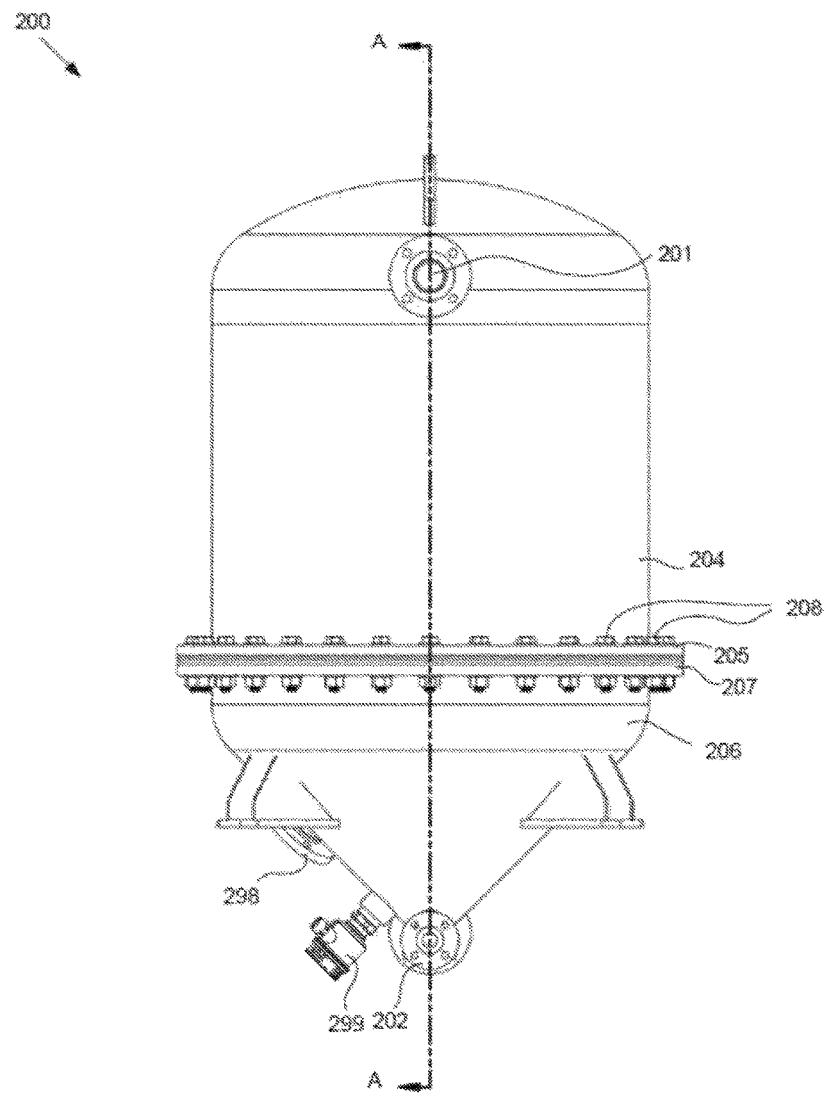
FIG. 3 is a side view of the apparatus of FIG. 2, according to one embodiment.
Figure 4:
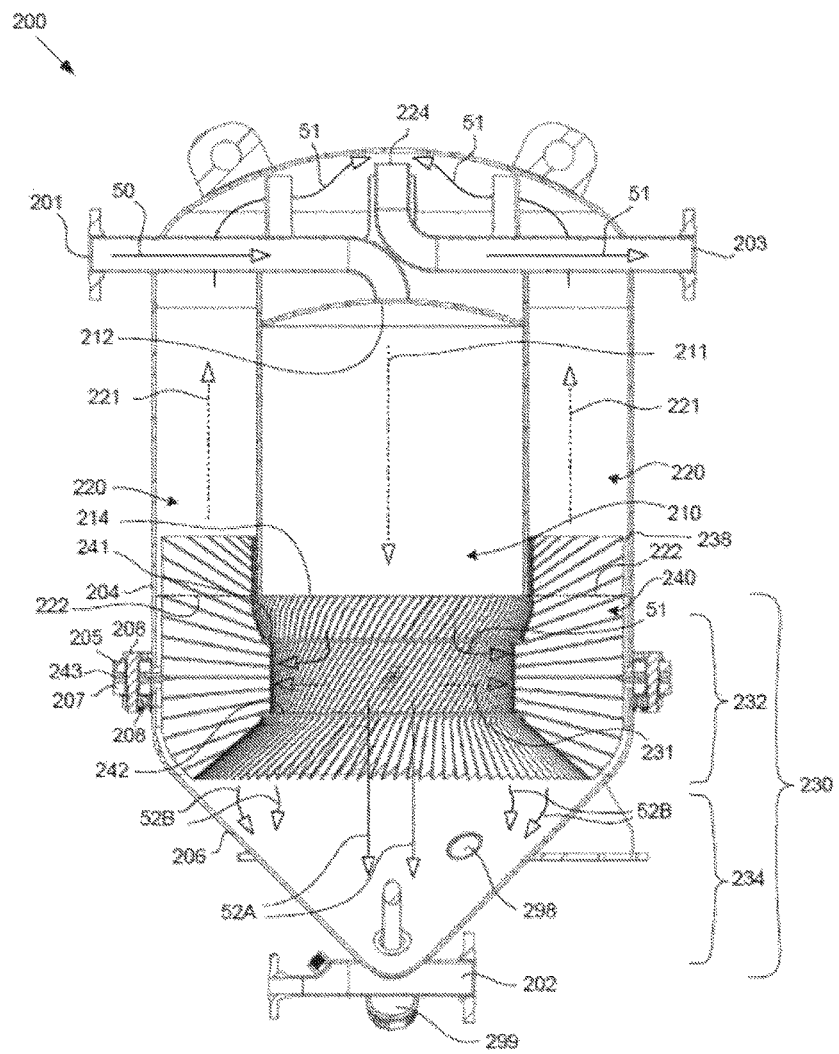
FIG. 4 is a cross-sectional view, as seen from reference plane A shown in FIG. 3. of the apparatus of FIG. 3, according to one embodiment.

FIGS. 2-4 illustrate various views of another embodiment of the apparatus 200 for removing solid particles 52 from the liquid stream 50. More specifically, FIG. 2 is a perspective view, FIG. 3 is a side view, and FIG. 4 is a cross-sectional view, as seen from reference plane A shown in FIG. 3, of the apparatus 200.

The apparatus 200, which is similar to the embodiment of the apparatus 100 shown in FIG. 1, has a cylindrical tank structure. The apparatus 200 includes a liquid stream inlet 201 and a refined liquid carrier outlet 203. In the depicted embodiment, the liquid stream inlet 201 and the refined liquid carrier outlet 203 are disposed on opposite sides of the apparatus 200. The apparatus 200 also includes multiple ports 202, 299, 298 disposed near the bottom of the apparatus 200. The port at the bottom of the apparatus 200 is the solid outlet 202. The solid particles that fall out of the liquid carrier and collect in a bottom portion 206 of the apparatus 200 can be removed from the apparatus 200 via the solid outlet 202 by gravity flow, pressure from an inlet pump, pressure from a pump independent of the inlet pumps, and/or a screw mechanism. The other ports 299, 298 are used for various types of instruments that can detect the level of the solids accumulating in the bottom portion 206 of the apparatus. In one embodiment, the lower port 299 is used for a tuning fork or similar instrument that measures denser particles. The higher port 298 may be another density detection device that measures lower density solids that settle out slower or may form in a "rag layer" in an upper area of the bottom portion 206, just below the inclined plates 240.

Figure 5:
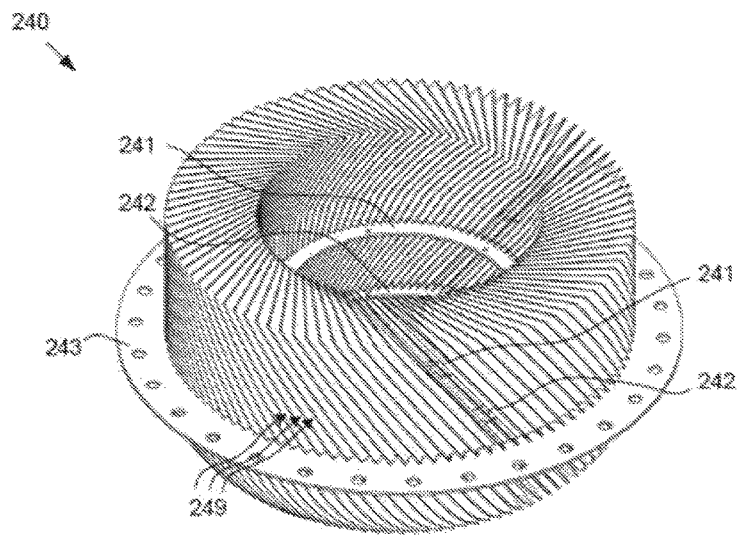
FIG. 5 is a perspective view of the inclined plate-pack of FIG. 4, according to one embodiment.
Figure 6:
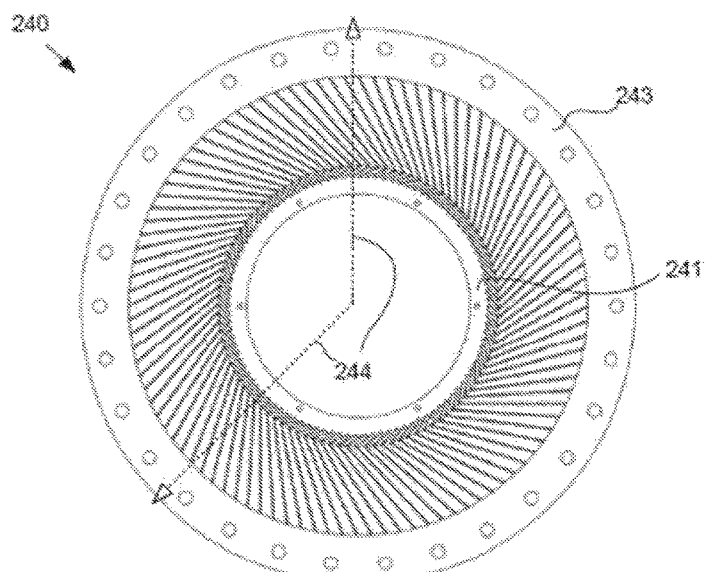
FIG. 6 is a top view of the inclined plate-pack of FIG. 5, according to one embodiment.

In the depicted embodiment, the housing of the apparatus 200 includes an upper portion 204 and a lower portion 206 that are detachably coupled together. As described below, the detachable coupling between the upper and lower portions 204, 206 allows easy access to the interior of the apparatus 200 for maintenance, repair, etc. The upper portion 204 has an upper flange 205 that couples to a corresponding lower flange 207 of the lower portion 206. Fasteners 208, such as bolts and nuts, may be employed to securely hold the two portions 204, 206 together. In one embodiment, as shown in FIGS. 4-6, the configuration of inclined plates 240 may have an external flange 243 that is sandwiched between the upper and lower flanges 205, 207 of the housing of the apparatus 200. In such an embodiment, the fasteners 208 that hold the two portions 204, 206 of the housing together also serve to secure the configuration of the inclined plates 240. In certain applications, it may be beneficial for the inclined plates 140 (i.e., the "plate pack" 140) to be removable from the apparatus 200, thereby enabling a user to swap out plate packs, repair plate packs, or clean plate packs, etc. In other embodiments, the inclined plates 240 may be held in place using an internal structure attached to flow chamber 210 or they may be attached to flow chamber 210 with clips or tabs or may be welded to flow chamber 210.

The apparatus 200 is configured to receive the liquid stream 50 through a liquid stream inlet 201 disposed on one side of the upper portion 204 of the apparatus 200. The liquid stream 50 flows through a pipe to the first flow chamber 210, which is the central chamber of the apparatus 200. The liquid stream 50 flows out of the inlet pipe through an inlet 212 of the first flow chamber 210. The liquid stream 50 in the first flow chamber 210 flows in the first direction 211 at the first velocity. Once again, the first direction 211 is substantially parallel to gravity (i.e., downward) and the first velocity is greater than the settling velocity of the solid particles 52 in the liquid carrier 51.

After passing through the first flow chamber 210, the liquid carrier 51 flows into the separation chamber 230. The separation chamber 230 has the redirection portion 232 and the collection portion 234. In the redirection portion 232, the flow direction of the liquid carrier 51 transitions from the first direction 211 to the second direction 221. The cross-sectional flow area of the second flow chamber 220 is larger than the cross-sectional flow area of the first flow chamber 210 to slow the liquid carrier 51 down to the second velocity (which is less than or equal to the settling velocity of the solid particles 52 in the liquid carrier 51).

The inclined plates 240 are disposed in the separation chamber 230 and fluidly couple an outlet 214 of the first flow chamber 210 and an inlet 222 of the second flow chamber 220. FIGS. 5 and 6 show views of the annular formation of the inclined plates 240 removed from the housing of the apparatus 200. More specifically, FIG. 5 is a perspective view of the annular formation of the inclined plates 240 and FIG. 6 is a top view of the annular formation of inclined plates 240, according to one embodiment.

In the depicted embodiment, the inclined plates 240 are disposed in the redirection portion 232 of the separation chamber 230 and are circumferentially spaced apart in an annular formation. The inclined plates 240 are secured together in the annular formation (e.g., instead of being loose and independently movable). The annular formation of inclined plates 240 is held together, as a unit, by 'ring flanges'. In other words, the annular formation of the inclined plates 240 has an external flange 243 and one or more internal flanges. In the depicted embodiment, the annular formation of inclined plates 240 has two internal flanges 241, 242. The individual plates are mounted between the external flange 243 and the internal flanges 241, 242. The external flange 243, as described above, engages the upper and lower flanges 205, 207 of the housing of the apparatus 200 to secure the position of the annular formation of the inclined plates 240 within the apparatus 200. The first internal flange 241 of the inclined plates 240 is positioned higher (relative to the gravity vector) than the external flange 243 and the second internal flange 242 is positioned lower than the external flange 243 (e.g., see FIG. 4). Such a configuration yields a unit of inclined plates 240 that has structural rigidity. In another embodiment, the inclined plates 240 can be supported by bands around the exterior of the inclined plates 240 that are attached to the plates with tabs and/or by welding. In another embodiment, the inside of the inclined plates 240 can be supported by attaching the inclined plates 240 directly to an internal cylinder or cone with either tabs and/or welding instead of using rings 241, 242.

The annular formation of inclined plates 240 is positioned proximate the inlet 222 of, and substantially concentric with the annulus that is, the second flow chamber 220. In one embodiment, the inclined plates 240 extend partially or completely into the second flow chamber 220. That is, a portion of the inclined plates 240 extends beyond the inlet 222 of the second flow chamber 220. Higher surface area may improve the degree of separation that is achieved by extending the surface area of the inclined plates 240 above the outlet 214 of the first flow chamber 210.

In another embodiment, more than half or even up to all of the height of the annular formation of the inclined plates 240 extends above the external flange 243. Said differently, a major portion of the annular formation of inclined plates 240 extends above the external flange 243 while a minor portion extends below the external flange 243. In such a configuration, a greater portion of the total height of the annular formation of inclined plates 240 extends into the upper portion 204 of the apparatus 200 than the lower portion 206 of the apparatus 200. As mentioned above, the lower portion 206 of the apparatus 200 may have a conical shape that helps to funnel the settling solid particles 52B to the very bottom of the apparatus 200 for extraction via the solids outlets 202. In one embodiment, the annular formation of the inclined plates 240 extends partially into the conical section of the lower portion 206 of the apparatus 200. As shown in FIG. 4, and according to one embodiment, the internal diameter of the annular formation of the inclined plates 240 is narrowest between the first and second internal flanges 241, 242.

The space between adjacent inclined plates, defined above as inclined channels 249 (e.g., see FIG. 5), may be dependent on the specifics of a given application. For example, the spacing between the inclined plates 240 may be dependent on the concentration of solid particles in the liquid carrier and/or the average expected size of the solid particles. In one embodiment, the spacing between adjacent inclined plates (i.e., the thickness of the inclined channels 249) is between about 0.25 inches and about 1 inch. In another embodiment, the spacing between adjacent inclined plates is about 0.5 inches. In one embodiment, the spacing between adjacent plates is uniform throughout the annular formation.

In one embodiment, the spacing between adjacent plates is less than conventional plate-type clarifiers. For example, conventional plate-type clarifiers may experience plugging or clogging because the entire flow of the liquid stream, or at least a major extent of the flow of the liquid stream, is channeled directly towards the plates in conventional clarifiers and/or conventional clarifiers do not incorporate a 180-degree redirection aligned with gravity or a decrease in velocity. In other words, the apparatus 200 of the present disclosure is especially effective and efficient because, according to the embodiment depicted in FIG. 4, the larger, denser solid particles 52A flow right through the center core of the annular formation of the inclined plates 240 without flowing in the third direction 231 into the inclined channels 249 defined by the inclined plates 240. Because the largest and/or most dense solid particles do not pass across the inclined plates 240, the annular formation of inclined plates 240 is comparatively less prone to clogging and plugging.

As mentioned above, the smaller, less dense solid particles 52B flow sideways (e.g., flow in the third direction 231) with the liquid carrier 51 across the inclined plates 240 (i.e., into and through the channels 249). By entering the inclined channels in a substantially sideways direction 231, the plate separation process is not working directly against gravity (e.g., like some conventional up-flow clarifiers). In one embodiment, the size and dimension of the annular formation of the inclined plates 240 is such that a gap 238 is left between the external perimeter of the annular formation of the inclined plates 240 and the inner sidewalls of the separation chamber 230. Because the liquid carrier 51 enters the channels 249 sideways 231, any solid particles that remain entrained with the liquid carrier 51 after crossing the inclined plates 240 will catch on the edge and be directed downward towards the collection portion 234 through the gap 238.

In one embodiment, the slope of the inclined plates 240, relative to horizontal, is between about 20 degrees and about 70 degrees. In another embodiment, the slope of the inclined plates 240, relative to horizontal, is about 55 degrees. As mentioned above, where conventional clarifiers may experience plugging or clogging, the apparatus 200 of the present disclosure may allow for a comparatively wider range of possible slopes for the inclined plates 240. In another embodiment, as shown in FIG. 6, the inclined plates 240 are not only inclined relative to horizontal, but the inclined plates 240 are also angled relative to a radius 244 of the annular formation of inclined plates 240. That is, the inclined plates 240 are not aligned parallel with radii of the annular formation, but instead are offset from the radii of the annular formation. The angle effect of the circular shape of the annular formation draws or rakes the particles down and toward the outside of the inclined plates 140. This raking affect helps remove the particles from the flow of the liquid carrier 51 and limits re-entrainment of particles.

In one embodiment, the inclined plates may be electrostatically charged to further promote separation. In yet another embodiment, certain edges of the plates 240 may be bent to facilitate settling of the solid particles. As mentioned above, the apparatus 200 may be free of (i.e., does not include) any flow-affecting moving parts. For example, in one embodiment the apparatus 200 does not have any agitators or vibrating elements to promote separation.

While most of the figures of the present disclosure depicted cylindrical embodiments of the apparatus 200, it is expected that the apparatus can have other shapes or structures. Additionally, the apparatus 200 can be built from any type of metal, composite, and/or plastic material. The lower portion 206 of the apparatus 200, as mentioned above, may be conical in shape at any angle to facilitate collection of the solid particles. The steeper the angle, the faster that particles will slide into the cone and the thicker the solids will become in the bottom of the collection chamber 234. In another embodiment, the lower portion 206 may be dish-shaped or semi-circular. The upper portion 204 may be flat, dished, coned, flanged, or welded. In another embodiment, the flow chamber 210 can be conical or bell shaped. The apparatus 200 can be operated at atmospheric conditions or under pressure. The size and dimensions of the apparatus may be tailored for a specific application.

Figure 7:
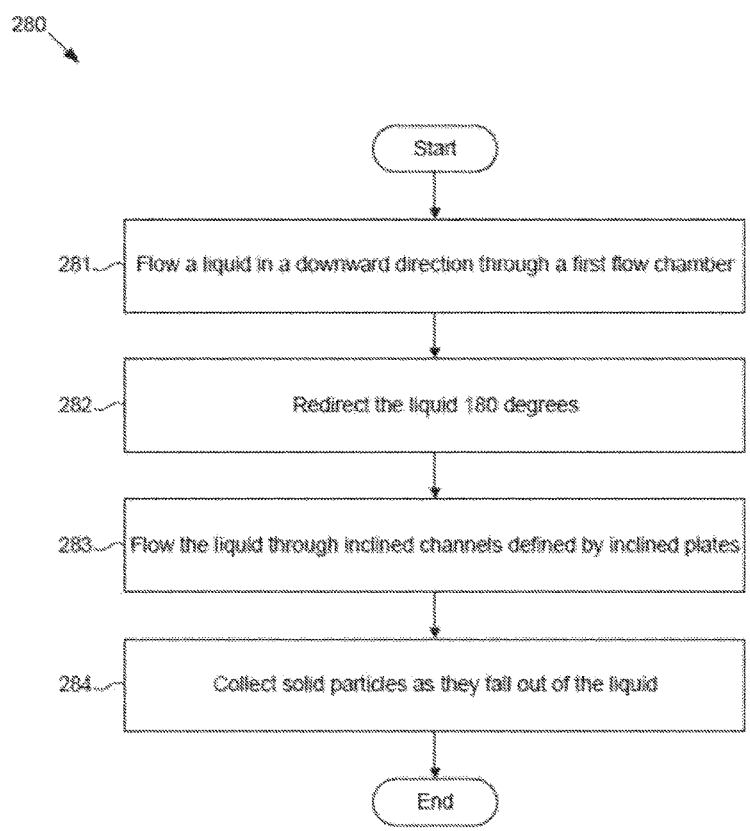
FIG. 7 is a schematic flow chart diagram of a method for removing solid particles from a liquid stream, according to one embodiment.

FIG. 7 is a schematic flow chart diagram of a method 280 for removing solid particles from a liquid stream, according to one embodiment. The liquid stream includes a liquid carrier that has solid particles mixed therein. The solid particles have a specific gravity that is greater than the specific gravity of the liquid carrier. The method 280 includes flowing the liquid stream through a first flow chamber in a first direction at a first velocity at 281. The first direction is substantially parallel to gravity and the first velocity is greater than a settling velocity of the solid particles in the liquid carrier. The method 280 further includes redirecting the liquid carrier 180 degrees such that the liquid carrier flows into a second flow chamber in a second direction opposite the first direction at a second velocity less than the settling velocity at 282. During redirecting the liquid carrier, the liquid carrier flows into inclined channels at 283, which are defined by inclined plates and fluidly couple an outlet of the first flow chamber and an inlet of the second flow chamber, in a third direction substantially perpendicular to the first and second directions. The method 280 also includes collecting the solid particles as the solid particles fall out of the liquid carrier during redirecting the liquid carrier at 284.

In one embodiment, the method includes electrostatically charging the inclined plates. In another embodiment, the first velocity is about twice the second velocity.

Figure 8:
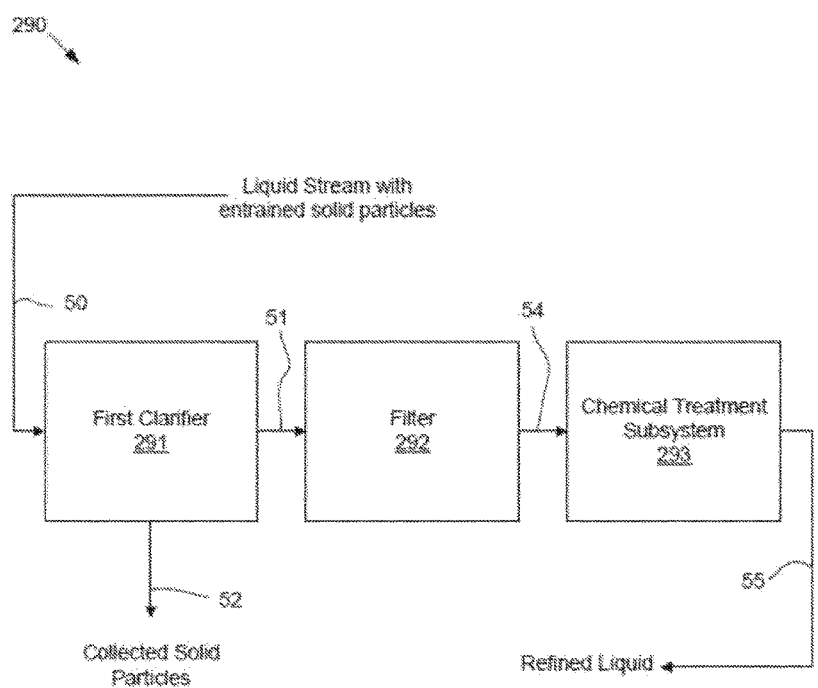
FIG. 8 is a schematic block diagram of a system for removing solid particles from a liquid stream, according to one embodiment.

FIG. 8 is a schematic block diagram of a system 290 for removing solid particles from a liquid stream 50, according to one embodiment. The system 290 shows how the apparatus 100, 200 might be used in a treatment system that includes a first clarifier 291 (apparatus 100, 200) The system also includes a chemical treatment subsystem 293 that receives and disinfects the liquid carrier 51 from the first clarifier 291 and a filter 292 that receives and further clarifies the liquid carrier 51 from the first clarifier subsystem 291. In one embodiment, the filter 292 receives the refined liquid carrier 51 from the first clarifier 291 before the chemical treatment subsystem 293. In another embodiment, the chemical treatment subsystem 293 receives the refined liquid carrier 51 from the first clarifier 291 before the filter 292. Regardless the order, the filtered liquid carrier 54 and the chemically treated liquid carrier 55 constitute a refined liquid stream. In one embodiment, the system 290 further includes one or more of the following: a pH adjustment subsystem, a de-emulsifier subsystem, a desalination subsystem, and a flocculant subsystem.

Figure 9:
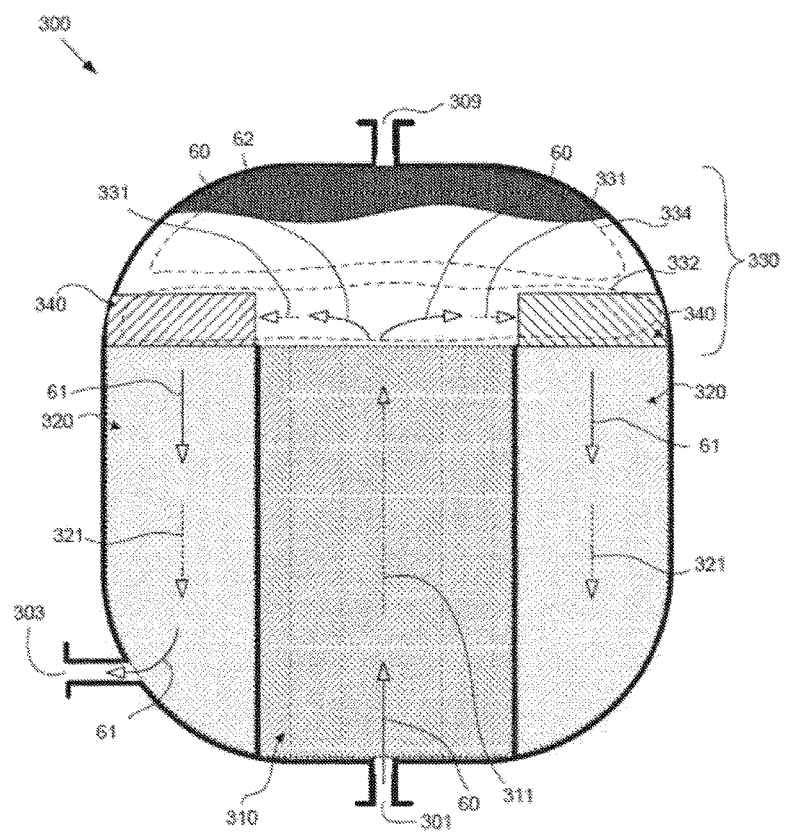
FIG. 9 is a schematic, cross-sectional view of an apparatus for removing a lower-density liquid from a liquid stream, according to one embodiment.

FIG. 9 is a schematic, cross-sectional view of the apparatus 300 for removing a lower-density liquid 62 from a liquid stream 60, according to one embodiment. The depicted embodiment of the apparatus 300 is similar in concept to the previously described embodiments with regard to a 180-degree redirection, a decreased flow velocity, and inclined plates. However, the apparatus 300 of FIG. 9 is utilized for separating a lower-density liquid 62 from a liquid carrier 61.

As mentioned above, the lower-density liquid 62 refers to a liquid that has a specific gravity that is less than the specific gravity of the liquid carrier 61. The difference between the specific gravities of the liquid carrier 61 and the lower-density liquid 62 is a major driving force of a successful separation. In other words, the specific gravity of the liquid carrier 61 contrasted with the specific gravity of the lower-density liquid 62 yields potential energy which is exploited in order to accomplish the separation. In one embodiment, for example, the liquid carrier 61 is water and the lower-density liquid 62 is oil or other hydrocarbons.

The apparatus 300 is configured to receive the liquid stream 60 through a liquid stream inlet 301 and to output collected lower-density liquid 62 through a lower-density liquids outlet 309 and a refined liquid carrier 61 through a liquid carrier outlet 303. The apparatus 300 has a first flow chamber 310, a second flow chamber 320, and a separation chamber 330 disposed between the first and second flow chambers 310, 320. The liquid stream 60 enters the first flow chamber 310 and flows through the first flow chamber 310 in a first direction 311. The velocity of the liquid stream 60 upon exiting the first flow chamber 310 is referred to as the first velocity. The first direction 311 is opposite gravity (i.e., upwards) and the first velocity is greater than a rise-velocity of the lower-density liquid 62 in the liquid carrier 61. In other words, the upward speed of the liquid stream 60 in the first flow chamber 310 is greater than the speed of which the lower-density liquid 62 would rise, due to buoyancy, through the liquid carrier 61. The rise-velocity of specific lower-density liquid droplets 62 in a specific liquid carrier can be calculated according to Stokes' law.

After passing through the first flow chamber 310, the liquid stream flows into the separation chamber 330. The separation chamber 330 has two portions, a redirection portion 332 and a collection portion 334. In the redirection portion 332, the flow direction of the liquid carrier 61 transitions from the first direction 311 to a second direction 321 opposite the first direction 311. In other words, the liquid carrier 61 is redirected 180 degrees and flows downwards into the second flow chamber 320. During this redirection, the liquid carrier 61 also slows from the first velocity to a second velocity. The magnitude (i.e., speed) of the second velocity is less than the first velocity and is also less than the above discussed rise-velocity of the lower-density liquid 62 in the liquid carrier 61.

The speed decrease of the liquid carrier 61, together with the 180-degree redirection of the liquid carrier 61, contribute to the lower-density liquid 62 rising out of the liquid carrier 61 and collecting in the collection portion 334 of the separation chamber 330. Thus, the apparatus 300 utilizes flow direction (e.g., the first direction 311 is opposite to gravity), flow redirection (e.g., changing from the first direction 311 opposite gravity to the second direction 321 parallel to gravity), and a change in flow velocities (e.g., slowing from the first velocity to the second velocity) to maximize the efficiency of the gravity separation.

The cross-sectional flow area of the second flow chamber 320 is larger than the cross-sectional flow area of the first flow chamber 310 to slow the liquid carrier 61 down to the second velocity (which is less than or equal to the rise-velocity of the lower-density liquid 62 in the liquid carrier 61). In one embodiment, the cross-sectional area of the second flow chamber 320 is between about 1.5 and about 3 times larger than the cross-sectional area of the first flow chamber 310. In one embodiment, the first velocity is about twice the second velocity. In one embodiment, the first velocity is such that flow of the liquid stream 60 in the first flow chamber 310 may be turbulent or laminar. In another embodiment, the second velocity is such that flow of the liquid carrier 61 in the second flow chamber 320 is always laminar. The relative cross-sectional sizes of the first and second flow chambers 310, 320 can vary from application to application depending on the type of liquid carrier 61, the type of lower-density liquid 62, and the relative specific gravities of the liquid carrier 61 and the lower-density liquid 62, among other factors.

In addition to the speed decrease and the 180 degree redirection, the separation chamber 330 of the apparatus 300 may also include a configuration of inclined plates 340 disposed in the fluid flow path starting at the end of the first flow chamber 310 and protruding some distance above flow chamber 310 into separation chamber 330 then continuing down through some portion of the second flow chambers 320 that can include anywhere from about 10% of flow chamber 320 up to about 90% of flow chamber 320, depending on the desired separation efficiency. That is, the inclined plates 340 define inclined channels (e.g., similar to the inclined channels 249 in FIG. 5) through which the liquid carrier 61 must flow while slowing from the first velocity to the second velocity and while redirecting from the first direction 311 to the second direction 321. The entry into the inclined plates 340 can be straight into the plates or the inside edge of the inclined plates 340 can be bent to cause additional redirection of the liquid carrier 61. Buoyance lifts lighter particles up so that if they are large enough and light enough to overcome the directional flow of the liquid carrier 61 in a laminar flow condition they hit an inclined plate. Velocity at the surface of any given inclined plate 340 is negligible. Once a solid particle touches the surface of an inclined plate 340 the particle slides up the plate into separation chamber 330. Because of the circular shape of apparatus 300 the tilt and angle of the inclined plates 340 penetrating into separation chamber 330 draw or rake the particles up and toward the outside of the inclined plates 340. This raking affect helps remove the particles from the flow of the liquid carrier 61 and limits re-entrainment of particles. Any lower-density liquid droplets 62 that have yet to rise out of the liquid carrier 61 due to the slowing and redirecting are allowed to settle via exposure to the extensive surface area of the inclined plates 340. The inclined plates 340 may be substantially similar to the inclined plates 240 described above with reference to FIGS. 4-6.

According to one embodiment, the liquid carrier 61 enters (e.g., flows into) the configuration of inclined plates 340 sideways. In other words, the liquid carrier 61, with any remaining lower-density liquid droplets that have yet to rise into the collection portion 334 of the separation chamber 330, flows into the configuration of inclined plates 340 in a third direction 331 that is substantially perpendicular to the first and second directions 311, 321.

The two portions 332, 334 of the separation chamber 330 are not physically well-defined or sharply delineated. That is, these portions 332, 334 of the separation chamber 330 are separately referred to herein according to the predominant and distinct flow characteristics of the liquid carrier 61 and lower-density liquid 62 in the respective portions 332, 334. The liquid carrier 61 predominantly redirects in the redirection portion 332 of the separation chamber 330 and the lower-density liquid 62 predominantly collects in the collection portion 334 of the separation chamber 330. Thus, in one embodiment, the separation chamber 330 does not have any physical features or barriers that distinguish the two portions 332, 334 from each other. For this reason, the redirection portion 332 and the collection portion 334 have been depicted in FIG. 1 as somewhat amorphous shapes.

The lower-density liquid 62 that rises into the collection portion 334 of the separation chamber 330 can be extracted from the apparatus 300 via a lower-density liquid outlet 309. In one embodiment, the apparatus 300 can be configured to continuously remove lower-density liquid 62 from the separation chamber 330. In another embodiment, batch-removal of the lower-density liquid 62 may be performed periodically or upon the determination that a certain amount (e.g., volume, mass, weight, etc.) of lower-density liquid 62 has settled in the collection portion 334 of the separation chamber 330. The lower-density liquid may be flushed, pumped, or suctioned out, among other methods, via the lower-density liquid outlet 309.

In one embodiment, the apparatus 300 is free of (i.e., does not include) any flow-affecting moving parts. For example, in one embodiment the apparatus 300 does not have any agitators or vibrating elements to promote separation.

The second flow chamber 320 directs the liquid carrier 61, which is substantially free of lower-density liquid down to a certain size, downwards in the second direction 321, continuing downward through the inclined plates 340. In one embodiment, the apparatus 300 removes hydrocarbons down to a droplet size ranging from about 5 microns to about 100 microns, depending on various factors, including the specific gravity differential, particle size, temperature, viscosity, and flow rate (e.g., Stokes' Law variables). The liquid carrier 61 can then flow out of the apparatus 300 via a refined liquid carrier outlet 303. In one embodiment, the apparatus 300 is cylindrical and one of the two flow chambers 310, 320 forms an annulus around the other. For example, the first flow chamber 310 may be a central channel and the second flow chamber 320 may be an annular channel that surrounds and is concentric with the first flow chamber 310. In another embodiment, the apparatus 300 is cylindrical and flow chamber 310 is cone shaped, with flow chamber 320 forming an annulus around the conical flow chamber 310. In either embodiment, the third direction 331 (i.e., the direction of the flow of the carrier fluid 61 into the configuration of inclined plates 340) is radially outward.

Figure 10:
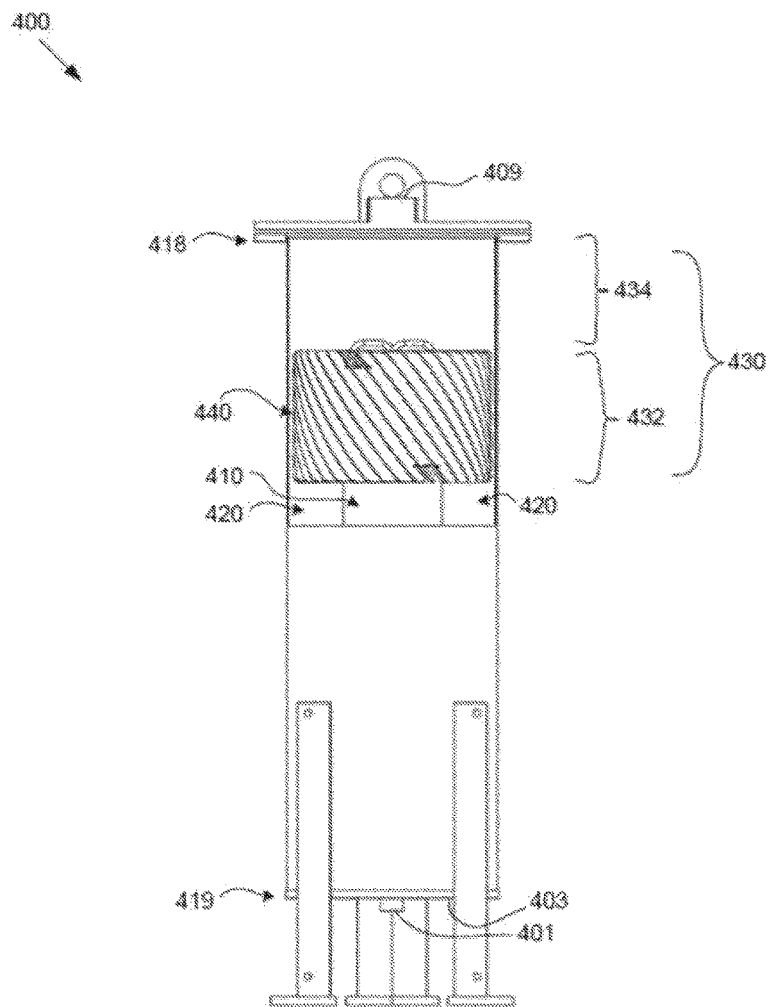
FIG. 10 is a cross-section view of one embodiment of an apparatus for removing a lower-density liquid from a liquid stream.

FIG. 10 is a cross-section view of one embodiment of the apparatus 400 for removing the lower-density liquid from the liquid stream. Similar and analogous to the schematic depiction of FIG. 9, the embodiment of the apparatus 400 in FIG. 10 has a first flow chamber 410 that receives the liquid stream from the liquid stream inlet 401. The first flow chamber 410 directs flow in an upwards direction. Upon exiting the first flow chamber, the liquid carrier flows across multiple inclined plates 440 disposed in the redirection portion 432 of the separation chamber 430. As the liquid stream flows across the inclined plates 440, the lower-density liquid separates from the liquid carrier. The separated lower-density liquid collects in the collection portion 434 of the separation chamber 430. The liquid carrier flows out of the configuration of inclined plates 440 and enters the second flow chamber 420. The refined liquid carrier flows in a downward direction through the second flow chamber 420.

In the depicted embodiment, the apparatus 400 has top and bottom heads 418, 419 that are flat. In other embodiments, the top and bottom heads 418, 419 can be torispherical, elliptical, conical, hemispherical, etc. In one embodiment, the apparatus 400 has coalescing media disposed in one or both of the first and second flow chambers 410, 420. The coalescing media may polypropylene, polyethylene, or some other type of coalescing-inducing material.

Figure 11:
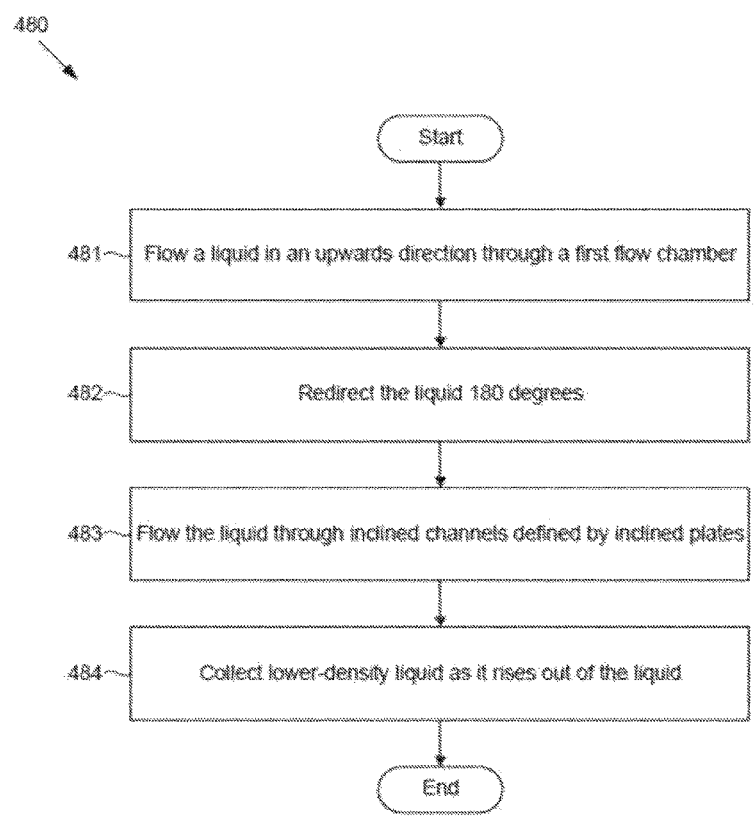
FIG. 11 is a schematic flow chart diagram of a method for removing a lower-density liquid from a liquid stream, according to one embodiment.

FIG. 11 is a schematic flow chart diagram of a method 480 for removing a lower-density liquid from a liquid stream, according to one embodiment. The liquid stream includes a liquid carrier having a lower-density liquid mixed therein and the lower-density liquid has a specific gravity that is less than a specific gravity of the liquid carrier. The method 480 includes flowing the liquid stream through a first flow chamber in a first direction at a first velocity at 481. The first direction is substantially opposite gravity and the first velocity is greater than a rise-velocity of the lower-density liquid in the liquid carrier. The method 480 further includes redirecting the liquid carrier 180 degrees such that the liquid carrier flows through a second flow chamber in a second direction opposite the first direction at a second velocity less than the rise-velocity at 482. The method 480 further includes flowing the liquid carrier out of inclined channels in a third direction substantially perpendicular to the first and second directions at 483. The inclined channels are defined by inclined plates and fluidly couple an outlet of the first flow chamber and an inlet of the second flow chamber. The method 480 further includes collecting the lower-density liquid as the lower-density liquid rises out of the liquid carrier during redirecting the liquid carrier at 484.

In one embodiment, the method includes electrostatically charging the inclined plates. In another embodiment, the first velocity is about twice the second velocity.

Figure 12:
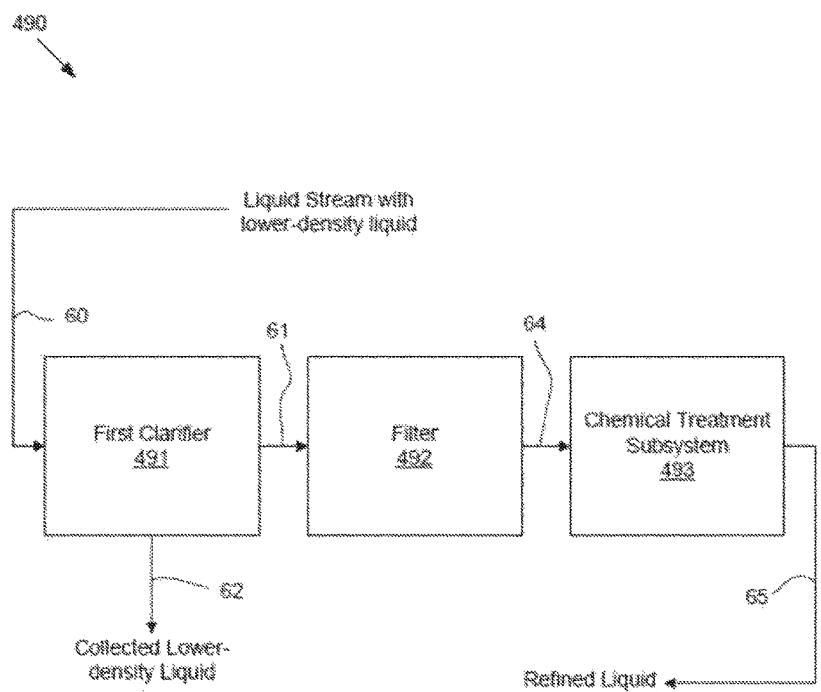
FIG. 12 is a schematic block diagram of a system for removing a lower-density liquid from a liquid stream, according to one embodiment.

FIG. 12 is a schematic block diagram of a system 490 for removing a lower-density liquid from a liquid stream 60, according to one embodiment. The liquid stream includes a liquid carrier having a lower-density liquid mixed therein. The lower-density liquid has a specific gravity that is less than a specific gravity of the liquid carrier. The system 490 shows how the apparatus 300, 400 500 might be used in a treatment system that includes a first clarifier 491 (apparatus 300, 400, 500). The system 490 also includes a chemical treatment subsystem 493 and a filter 492. In one embodiment, the filter 492 receives the refined liquid carrier 61 from the first clarifier 491 before the chemical treatment subsystem 493. In another embodiment, the chemical treatment subsystem 493 receives the refined liquid carrier 61 from the first clarifier 491 before the filter 492. Regardless the order, the filtered liquid carrier 64 and the chemically treated liquid carrier 65 constitute a refined liquid stream. In one embodiment, the system 490 includes at least one of the following: a pH adjustment subsystem, a de-emulsifier subsystem, a desalination subsystem, and a coalescing subsystem. Further, the system 490 may include backwash media and/or a polishing filter. These components may be able to reduce hydrocarbons down to the parts per billion ranges.

Figure 13:
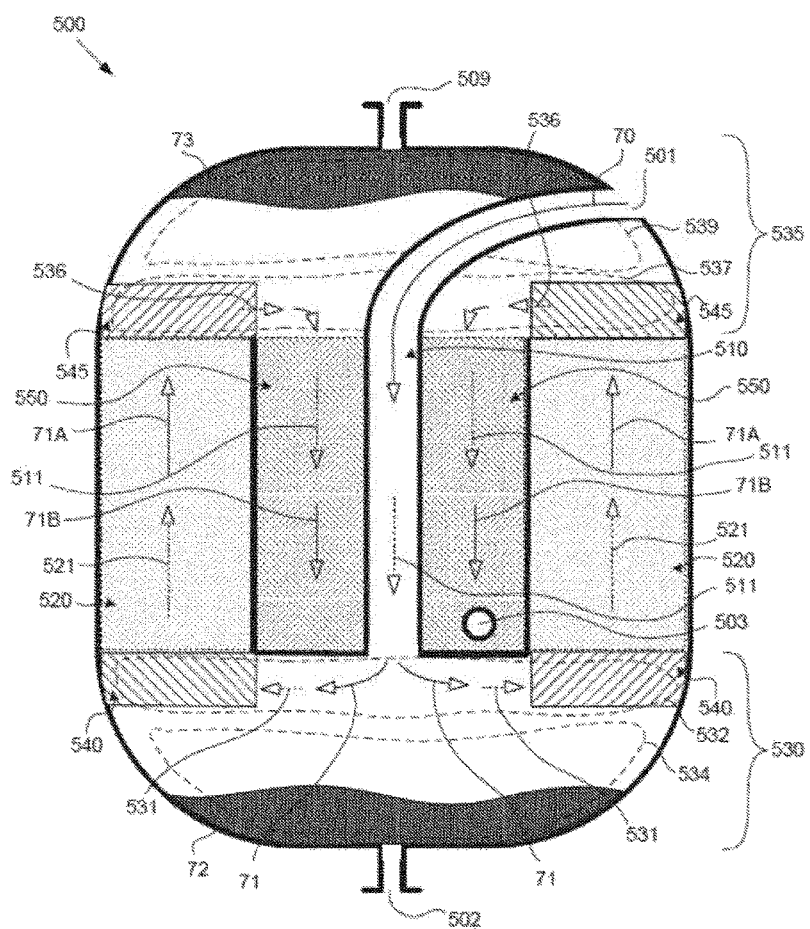
FIG. 13 is a schematic, cross-sectional view of an apparatus for removing both solid particles and a lower-density liquid from a liquid stream, according to one embodiment.
Figure 16:
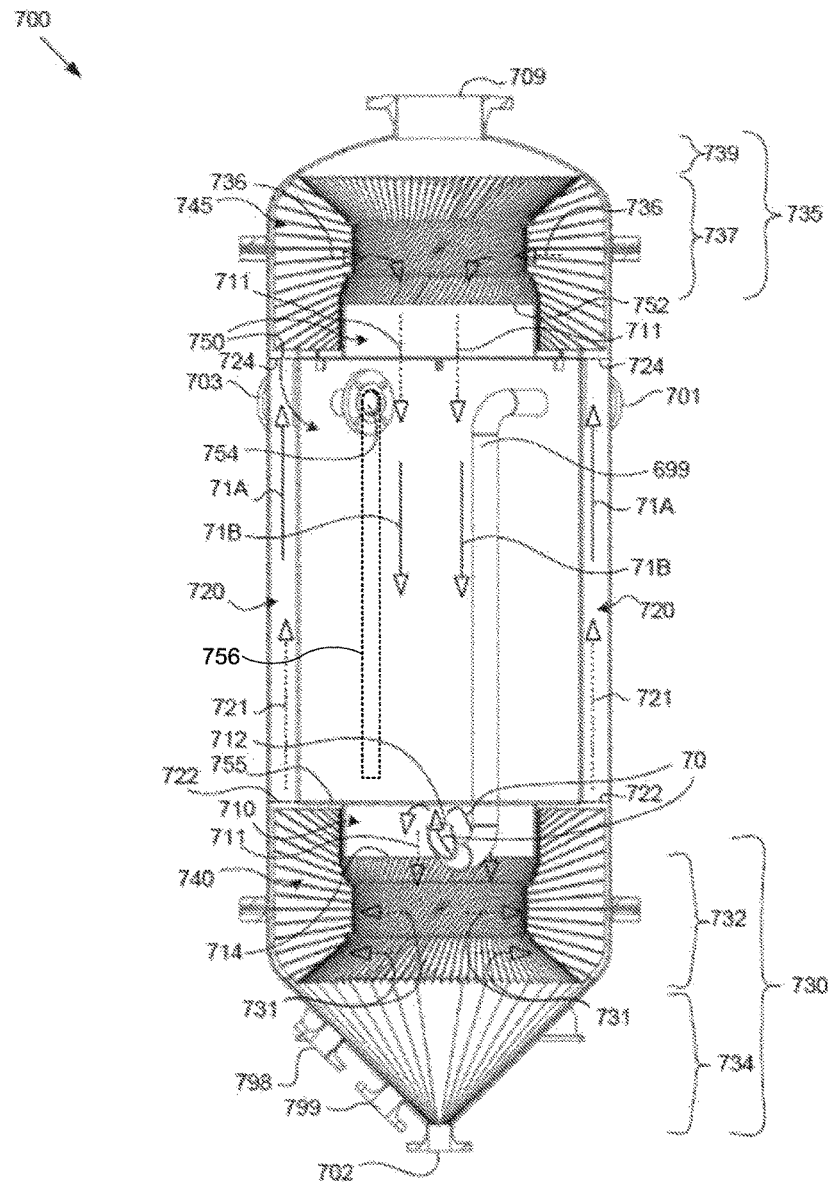
FIG. 16 is a cross-sectional view, as seen from reference plane C shown in FIG. 18, of the apparatus of FIG. 18, according to one embodiment.

FIG. 13 is a schematic, cross-sectional view of an apparatus 500 for removing both solid particles 72 and a lower-density liquid 73 from a liquid stream 70, according to one embodiment. The depicted apparatus 500 combines concepts from the solid-separator apparatus of FIGS. 1-8 with concepts from the liquid-separator of FIGS. 9-12. The depicted apparatus 500 includes three flow chambers 510, 520, 550, two separation chambers 530, 535, and two formations of inclined plates 540, 545. In one embodiment, as depicted in FIG. 13, the inlet pipe is the first flow chamber 510. However, in another embodiment, as depicted in FIG. 16, the inlet pipe 699 is not the first flow chamber 710 but instead the inlet pipe 699 delivers the liquid stream to the first flow chamber 710. In other words, the first flow chamber is defined as the flow compartment just before the 180-degree redirection.

The liquid stream 70 enters the apparatus at a liquid stream inlet 501 and flows into the first flow chamber 510 in a first direction 511 at a first velocity. The first direction 511 is parallel to gravity. The first velocity is greater than a settling velocity of the solid particles 72 in the liquid carrier 71. Upon exiting the first flow chamber 510, the liquid carrier 71 enters a bottom separation chamber 530. The liquid carrier 71 slows to a second velocity and transitions to flow in a second direction 521 opposite gravity. During slowing and redirection, the liquid carrier 71 flows in a third direction 531 perpendicular to the first and second directions 511, 521 into a bottom formation of inclined plates 540. Solid particles 72 in a redirection portion 532 of the separation chamber 530 settle out of the liquid carrier 71 and collect in a collection portion 534 of the separation chamber 530.

After passing through the bottom separation chamber 530 and the bottom formation of inclined plates 540, the liquid carrier 71A, now substantially free of solid particles down to a certain size, flows in the second direction 521 (e.g., upwards) through a second flow chamber 520 at the second velocity. The second velocity is less than the settling velocity of the solid particles 72. In one embodiment, the diameter of the center chamber (e.g., the third flow chamber 550) increases in the second direction 521, thus narrowing, in the second direction 521, the cross-sectional dimension of the second flow chamber 520 to increase the flow velocity in the second flow chamber back to the first velocity.

In one embodiment, the liquid carrier 71A flows out of the second flow chamber 520 at a third velocity and into a top formation of inclined plates 545 and a top separation chamber 535. In an alternative embodiment, the top inclined plates 545 may be omitted if the extra surface area of the top inclined plates 545 is not necessary to achieve a desired degree of separation. Regardless of whether the top inclined plates 545 are included, the liquid carrier 71A experiences a 180-degree redirection and transitions from the third velocity to a fourth velocity. The third velocity is defined herein as the velocity of the liquid carrier 71A flowing out of the second flow chamber 520 and the fourth velocity is defined herein as the velocity of the liquid carrier 71B flowing into the third flow chamber 550. In one embodiment, the second velocity (velocity into the second flow chamber) is the same as the third velocity (velocity out of the second flow chamber).

If the cross-sectional dimension of the second flow chamber 520 changes from the inlet to the outlet, the second velocity would not be the same as the third velocity. For example, if the cross-sectional dimension of the second flow chamber narrows (e.g., via tapering or a step transition), the magnitude third velocity may be substantially the same as the magnitude of the first velocity. That is, the liquid carrier 71A can speed back up to the magnitude of the first velocity so that the liquid enters both 180 redirections at substantially the same speed. Regardless of whether the second flow chamber undergoes a change in cross-sectional dimension, the first velocity (i.e., the velocity of the liquid carrier upon entering the first redirection (e.g., the bottom separation chamber 530) is greater than settling velocity of the solid particles in the liquid carrier. Also, the second velocity (e.g., the velocity of the liquid carrier exiting the first redirection (e.g., the bottom separation chamber 530) is less than the settling velocity of the solid particles in the liquid carrier. The same is true for the third and fourth velocities and the second redirection (e.g., the top separation chamber 535) with reference to the rise velocity of the lower-density liquid in the liquid carrier. That is, the third velocity (e.g., the velocity of the liquid carrier entering the top separation chamber) 535 is greater than the rise velocity while the fourth velocity (e.g., the velocity of the liquid carrier exiting the separation chamber 535) is less than the rise velocity. The liquid carrier 71A exits the top formation of inclined plates 545 in a fourth direction 536 substantially perpendicular to the first and second directions 511, 521. In one embodiment, the third and fourth directions 531, 536 are substantially opposite. That is, the third direction 531 is radially outward and the fourth direction 536 is radially inward.

The redirection and slowing of the liquid carrier in the redirection portion 537 of the top separation chamber 535, in conjunction with the flow of the liquid carrier through channels defined by the top formation of inclined plates 545, facilitates the separation of the lower-density liquid 73 from the liquid carrier. The lower-density liquid 73 accumulates in the collection portion 539 of the top separation chamber 535. The liquid carrier 71B, now substantially free of both solid particles 72 and lower-density liquid 73, flows in the first direction 511 (e.g., downwards) in the third flow chamber 550 at the fourth velocity that is less than the third velocity and that is less than the rise-velocity of the lower-density liquid 73 in the liquid carrier. The refined liquid carrier 71B flows out of the apparatus via a refined liquid carrier outlet 503.

In one embodiment, the second flow chamber 520 includes coalescing media to facilitate the separation of the lower-density liquid 73 from the liquid carrier. According to another embodiment, the second flow chamber 520 is annulus formed around the third flow chamber 550. Additional details relating to the apparatus 500 of FIG. 13 can be found above with reference to the similar and analogous embodiments described above. For example, the first and second flow chambers 510, 520, the bottom separation chamber 530, and the bottom inclined plates 540 are analogous to the first and second flow chambers 110, 120, the separation chamber 130, and the inclined plates 140 of FIG. 1, respectively. Also, the second and third flow chambers 520, 550, the top separation chamber 535, and the top inclined plates 545 are analogous to the first and second flow chambers 310, 320, the separation chamber 330, and the inclined plates 340 of FIG. 9, respectively.

Figure 14:
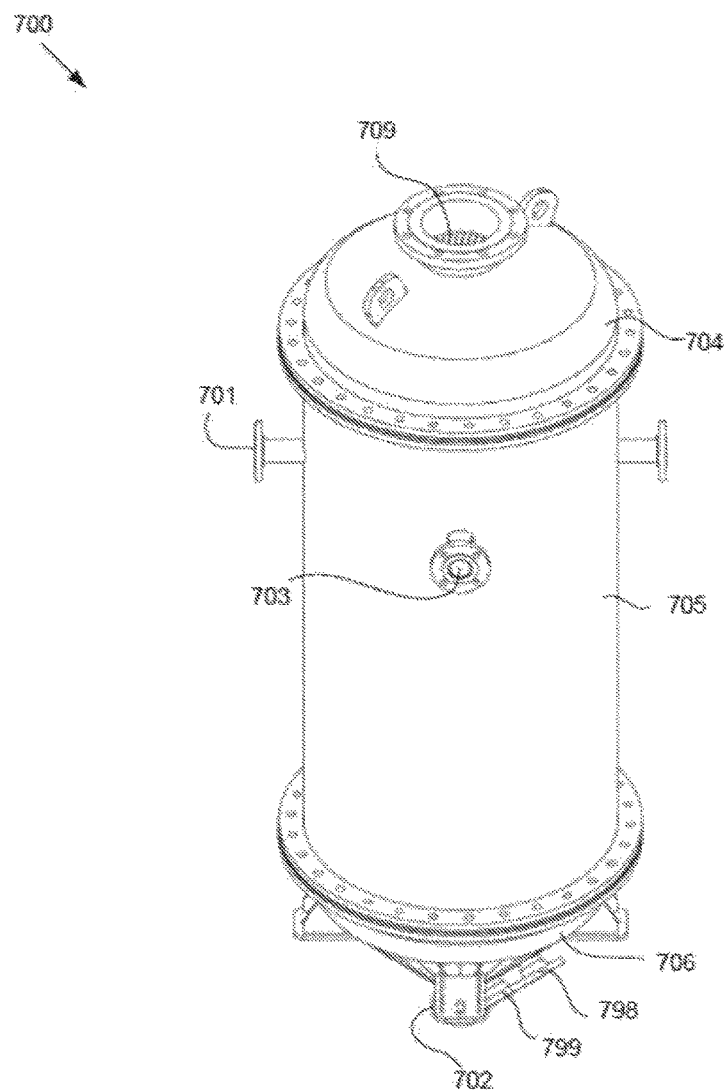
FIG. 14 is a perspective view of an apparatus for removing both solid particles and a lower-density liquid from a liquid stream, according to one embodiment.
Figure 15:
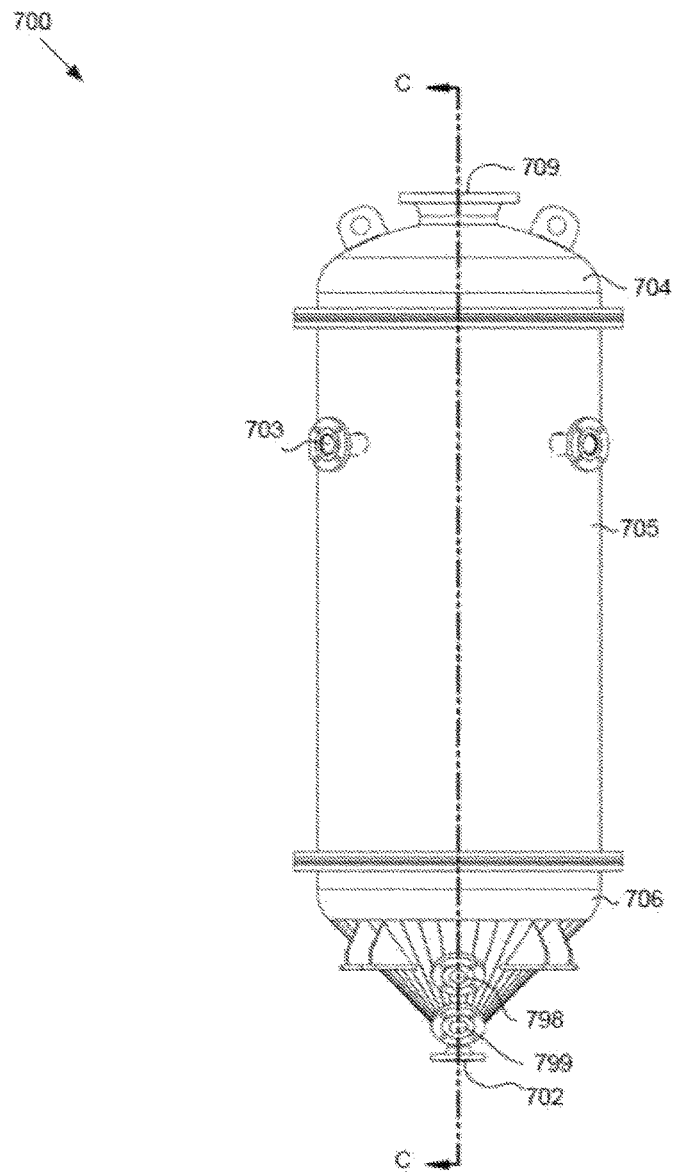
FIG. 15 is a side view of the apparatus of FIG. 17, according to one embodiment.

FIGS. 14-16 illustrate views of one embodiment of the apparatus 700 for removing both solid particles and a lower-density liquid from a liquid stream 70. In the depicted embodiment, two formations of inclined plates are included in the apparatus 700 to maximize the surface area of the inclined plates in order to maximize the separating power of the apparatus. More specifically, FIG. 14 is a perspective view, FIG. 15 is a side view, and FIG. 16 is a cross-sectional view, as seen from reference plane C shown in FIG. 15, of the apparatus 700, according to one embodiment. The depicted apparatus 700 is similar to the apparatus shown and described with reference to FIG. 13. The apparatus 700 includes three flow chambers 710, 720, 750, two separation chambers 730, 735, and two annular formations of inclined plates 740, 745. In an alternative embodiment, the apparatus may only include the bottom formation of inclined plates 740 and the top formation of inclined plates 745 may be omitted. For example, in certain applications the extra surface area of the top inclined plates 745 may not be required to achieve the necessary level of separation. That is, in one embodiment the bottom inclined plates 740, in conjunction with the second 180-degree redirection, may sufficiently separate the lower-density liquid from the liquid carrier.

The liquid stream 70 enters the apparatus at a liquid stream inlet 701 and flows through an inlet pipe 699. In another embodiment the inlet pipe 699 could enter through the apparatus 700 at any location as long as it ends at the same place just below separator plate 755. A separator plate 755 at the bottom of the third flow chamber 750 separates the third flow chamber 750 from the first flow chamber 710. After passing through the separator plate 755, the inlet pipe 699 outputs the liquid stream either straight down into the first flow chamber 710 (similar to FIG. 12) or the inlet pipe 699 includes a u-bend that turns the liquid stream 70 back in an upwards direction towards the separator plate 755 (as shown in FIG. 16). The outlet of the inlet pipe 699 is the inlet 712 of the first flow chamber 710. Accordingly, the liquid stream exits the inlet pipe 699 in an upwards direction and contacts the underside of the separator plate 755. After hitting the underside of the separator plate 755, the liquid stream flows downward in a first direction 711 parallel to gravity at a first velocity. Thus, while the overall and average direction of the flow of the liquid stream 70 in the first flow chamber 710 is in the first direction 711 (i.e., downward), the local, micro level flow direction of the liquid stream 70 immediately upon exiting the inlet pipe 699 is in an upwards direction, according to one embodiment. This local, micro level upwards flow causes the liquid stream 70 to strike the underside of the separator plate 755, thereby creating an even distribution across the flow chamber 710.

The first velocity is greater than the settling velocity of the solid particles 72 in the liquid carrier 71. Upon exiting the first flow chamber 710, the liquid carrier 71 enters a bottom separation chamber 730. The liquid carrier 71 slows to a second velocity and transitions to flow in a second direction 721 opposite gravity. During slowing and redirection, the liquid carrier 71 flows in a third direction 731 perpendicular to the first and second directions 711, 721 into a bottom formation of inclined plates 740. Solid particles 72 in a redirection portion 732 of the separation chamber 730 settle out of the liquid carrier 71 and collect in a collection portion 734 of the separation chamber 730. As described above with reference to FIGS. 2-4, the apparatus 700 includes multiple ports 702, 799, 798 disposed near the bottom of the apparatus 700. The port at the bottom of the apparatus 700 is the solid outlet 702. The solid particles that collect in the collection portion 734 can be removed from the apparatus 700 via the solid outlet 702 by gravity flow, pressure from an inlet pump, pressure from a pump independent of the inlet pumps, and/or a screw mechanism. The other ports 799, 798 can be used for various types of instruments that can detect the level of the solids accumulating in the collection portion 734. In one embodiment, the lower port 799 is used for a tuning fork or similar instrument that measures denser particles. The higher port 798 may be another density detection device that measures lower density solids that settle out slower or may form in a "rag layer" in an upper area of the collection portion 734, just below the inclined plates 740.

After passing through the bottom separation chamber 730 and the bottom formation of inclined plates 740, the liquid carrier 71A, now substantially free of solid particles down to a certain size, flows into the second direction 721 (e.g., upwards) at the second velocity and flows through the second flow chamber 720. In one embodiment, as the liquid carrier flows through the second flow chamber 720, the cross-sectional dimension of the second flow chamber 720 decreases so that the third velocity (e.g., the velocity of the liquid carrier 71A exiting the second flow chamber and flowing into the top separation chamber) is greater than the second velocity. That is, the velocity of the liquid carrier 71A increases by the time the liquid carrier 71A reaches the top of the second flow chamber 720. In one embodiment, the change in the cross-sectional dimension of the second flow chamber 720 may be directly correlated with the diameter of the central chamber (i.e., the third flow chamber 750). In one embodiment, as described above, the third velocity may have the same magnitude as the first velocity. The third velocity is greater than a rise-velocity of the lower-density liquid 73 in the liquid carrier 71A and the fourth velocity is less than the rise-velocity of the lower-density liquid 73 in the liquid carrier 71B.

The liquid carrier 71A flows out of the second flow chamber 720 and undergoes a second 180-degree redirection. As described above, the second 180 direction may include the top formation of inclined plates 745 shown in FIG. 16 or the top formation of inclined plates 745 may be omitted. That is, in certain implementations where the extra surface area of the top inclined plates is not necessary to achieve the liquid-liquid separation, the 180-degree redirection between the second 720 and third flow chambers 750 may sufficiently separate the lower-density liquid from the liquid carrier. It is also possible that the diameter of the center pipe does not transition and stays the same.

In the depicted embodiment, the liquid carrier 71A exits the top formation of inclined plates 745 in a fourth direction 736 substantially perpendicular to the first and second directions 711, 721. In one embodiment, the third and fourth directions 731, 736 are substantially opposite. That is, the third direction 731 is radially outward and the fourth direction 736 is radially inward.

The redirection and slowing of the liquid carrier in the redirection portion 737 of the top separation chamber 735, in conjunction with the flow of the liquid carrier through channels defined by the top formation of inclined plates 745, facilitates the separation of the lower-density liquid 73 from the liquid carrier. The lower-density liquid 73 accumulates in the collection portion 739 of the top separation chamber 735. The liquid carrier 71B, now substantially free of both solid particles 72 and lower-density liquid 73, flows in the first direction 711 (e.g., downwards) in the third flow chamber 750 at the fourth velocity that is less than the third velocity and that is less than the rise-velocity of the lower-density liquid 73 in the liquid carrier. The refined liquid carrier 71B flows out of the apparatus through an outlet 754 of the third flow chamber 750. In one embodiment, the outlet 754 of the third flow chamber 750 is connected to an outlet pipe 756 which extends from the outlet 754 to a point near the separator plate 755. Alternatively, the outlet 754 may be positioned near the bottom of the third flow chamber just above the separator plate 755.

In one embodiment, the second flow chamber 720 includes coalescing media to facilitate the separation of the lower-density liquid 73 from the liquid carrier. According to another embodiment, the second flow chamber 720 is annulus formed around the third flow chamber 750. In one embodiment, the third flow chamber 750 includes any type of backwashable media such as sand, black walnut shells or other backwashable media to collect or trap any solids or lower-density liquid that are not separated up to this stage from the liquid carrier. In one embodiment, the apparatus 700 includes a system for backwashing the media through component 703. In another embodiment flow chamber 750 could be in the shape of two cones with the small ends of each cone connected with the large end of the bottom cone connecting to flow chamber 720 and the large end of the top cone connecting being the start of flow chamber 750. In this embodiment the two inclined plates 740 and 745 could be connected into a single large inclined plate running from the bottom of inclined plate 740 to the top of inclined plate 745.

Additional details relating to the apparatus 700 of FIG. 13 can be found above with reference to the similar and analogous embodiments described above. For example, the first and second flow chambers 710, 720, the bottom separation chamber 730, and the bottom inclined plates 740 are analogous to the first and second flow chambers 110, 120, the separation chamber 130, and the inclined plates 140 of FIG. 1, respectively. Also, the second and third flow chambers 720, 750, the top separation chamber 735, and the top inclined plates 745 are analogous to the first and second flow chambers 310, 320, the separation chamber 330, and the inclined plates 340 of FIG. 9, respectively.

As described above, the apparatus 700 may include other features that facilitate or otherwise improve the ease, effectiveness, and/or degree of the separation. For example, in one embodiment the second flow chamber 720 includes coalescing media to improve the separation of the lower-density liquid from the liquid carrier. In another embodiment, back-washable media or other filters may be positioned in the third flow chamber to further refine the liquid carrier. In another embodiment the inclined plates are extended to connect inclined plates 740 to inclined plates 745 to form one long continuous inclined plate 740/745.

Figure 17:
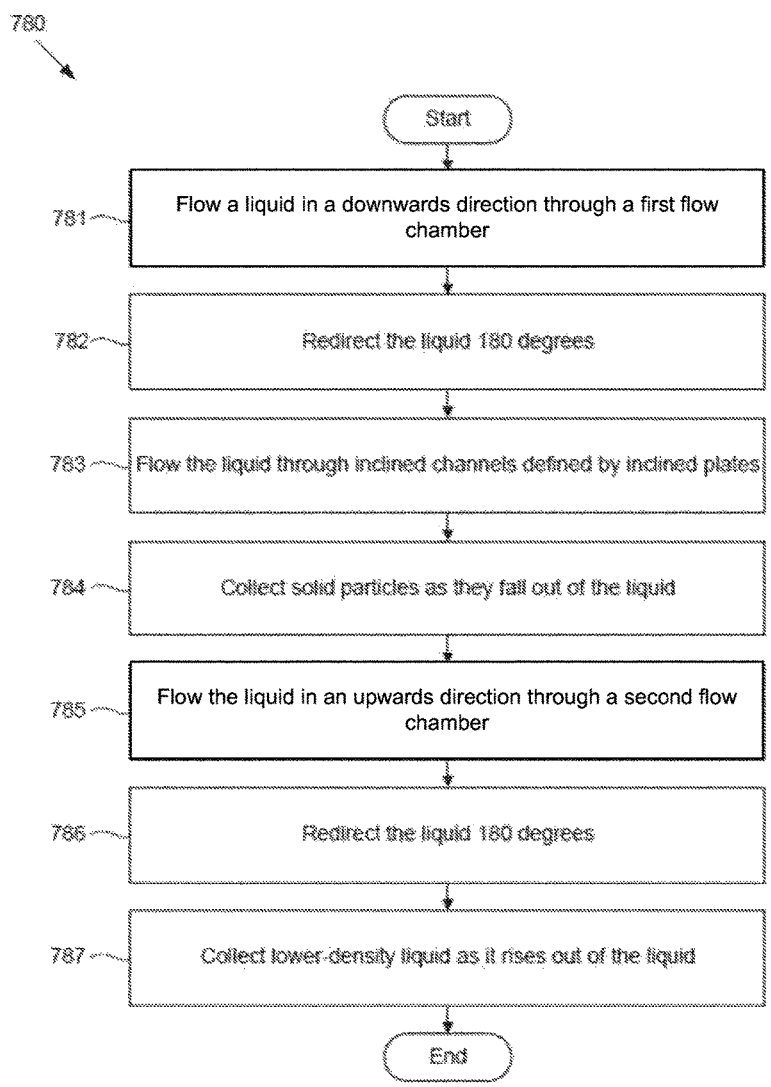
FIG. 17 is a schematic flow chart diagram of a method for removing both solid particles and a lower-density liquid from a liquid stream, according to one embodiment.

FIG. 17 is a schematic flow chart diagram of a method 780 for removing both solid particles and a lower-density liquid from a liquid stream, according to one embodiment. The solid particles have a specific gravity that is greater than the specific gravity of the liquid carrier and the lower-density liquid has a specific gravity that is less than the specific gravity of the liquid carrier. The method 780 includes flowing the liquid stream through a first flow chamber in a first direction at a first velocity at 781. The first direction is substantially parallel to gravity and the first velocity is greater than a settling velocity of the solid particles in the liquid carrier. The method 780 further includes redirecting the liquid carrier 180 degrees such that the liquid carrier flows from the first flow chamber to a second flow chamber in a second direction opposite the first direction at a second velocity less than the settling velocity at 782. The method 780 also includes, during redirecting the liquid carrier, flowing the liquid carrier into inclined channels in a third direction substantially perpendicular to the first and second directions at 783. The inclined channels are defined by inclined plates and fluidly couple an outlet of the first flow chamber and an inlet of the second flow chamber. The method 780 also includes collecting the solid particles as the solid particles fall out of the liquid carrier during redirecting the liquid carrier from the first flow chamber to the second flow chamber at 784 and flowing the liquid stream through the second flow chamber in the second direction at 785. In one embodiment, the second flow velocity is increased in the second flow chamber to a third velocity, which may have the same magnitude as the first velocity. The third velocity is greater than a rise-velocity of the lower-density liquid in the liquid carrier. The method 780 also includes redirecting the liquid carrier 180 degrees such that the liquid carrier flows from the second flow chamber at the third velocity to a third flow chamber in the first direction at the fourth velocity at 786 and collecting the lower-density liquid as the lower-density liquid rises out of the liquid carrier during redirecting the liquid carrier from the second flow chamber to the third flow chamber at 787.

In one embodiment, during redirecting the liquid carrier from the second flow chamber to the third flow chamber, the liquid carrier flows out of top inclined channels in a fourth direction substantially perpendicular to the first and second directions. The top inclined channels are defined by top inclined plates and fluidly couple an outlet of the second flow chamber and an inlet of the third flow chamber.

Figure 18:
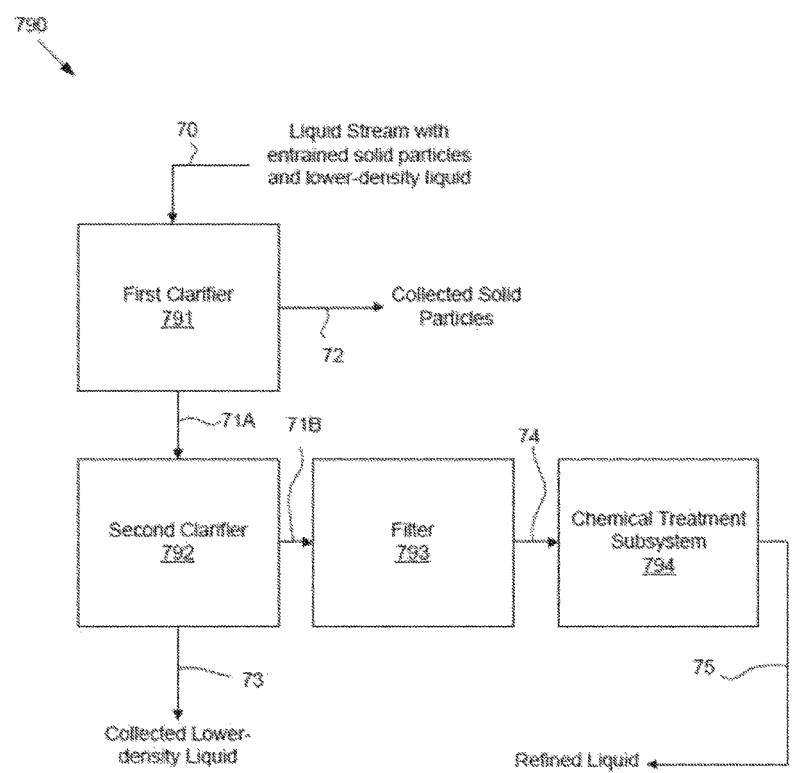
FIG. 18 is a schematic block diagram of a system for removing both solid particles and a lower-density liquid from a liquid stream, according to one embodiment.

FIG. 18 is a schematic block diagram of a system 790 for removing both solid particles and a lower-density liquid from a liquid stream 70, according to one embodiment. The system 290 shows how the various apparatus 100 through 700 might be used in a treatment system. The system also includes a chemical treatment subsystem 794 that receives and disinfects the liquid carrier 71 from the second clarifier 792 and a filter 793 that receives and further clarifies the liquid carrier 71 from the second clarifier subsystem 791. In one embodiment, the filter 793 receives the refined liquid carrier 71 from the second clarifier 792 before the chemical treatment subsystem 794. In another embodiment, the chemical treatment subsystem 794 receives the refined liquid carrier 71 from the second clarifier 792 before the filter 793. Regardless the order, the filtered liquid carrier 75 constitutes a refined liquid stream. In one embodiment, the system 790 further includes one or more of the following: a pH adjustment subsystem, a de-emulsifier subsystem, a desalination subsystem, and a flocculant subsystem.

Figure 19:
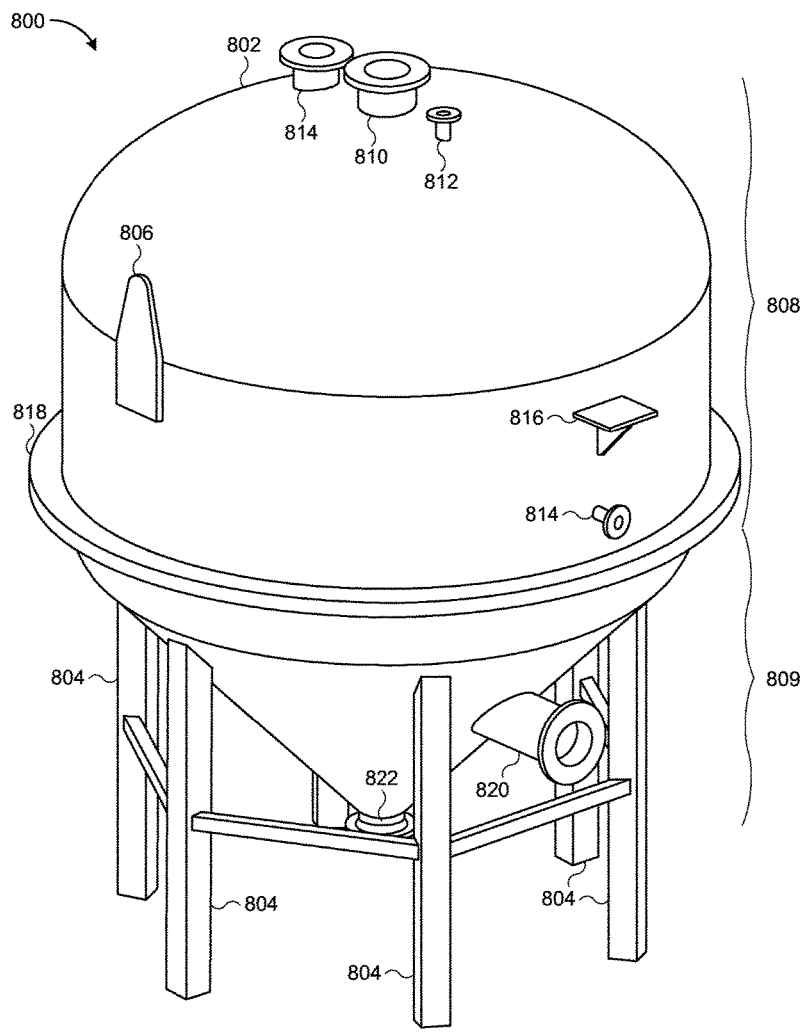
FIG. 19 is a perspective view of a system for removing waste from a liquid stream, according to one embodiment.

FIG. 19 is a perspective view of a system 800 for removing waste from a liquid stream, according to one embodiment. The illustrated embodiment includes a tank 802 supported by one or more support structures 804. In the illustrated embodiment, the tank 802 includes an attachment point 806. The attachment point 806 provides a location to remove or install a top piece 808 of the tank 802.

The illustrated embodiment of the system 800 also includes a liquid stream outlet 810. The liquid stream outlet 810 includes structure to facilitate removal of a liquid stream from the system 800. The liquid stream outlet 810 may couple to a pipe, hose, or valve, or facilitate direct connection of a pump or the like. Embodiments may include bolt through-holes, threaded nuts, threaded rods, clamps, magnetic couples, or other attachment structures. In the illustrated embodiment, the liquid stream outlet 810 is centered on a top of the tank 802. Alternatively, the liquid stream outlet 810 may be off-center on the tank 802.

The illustrated embodiment also includes a light waste outlet 812. The light waste outlet 812 provides an access point at which waste which is lighter in specific gravity than a liquid carrier of the liquid stream can be removed from the tank 802. In the illustrated embodiment, the light waste outlet 812 is positioned near a center of the tank 802. The light waste outlet 812 may also be positioned on or near a side of the tank 802 or off-center on the top of the tank 802.

The illustrated embodiment also includes one or more ports 814. The ports 814 provide fluid access to an interior of the tank 802. The ports 814 may provide access to remove material from the interior of the tank 802 or facilitate injection of material into the interior of the tank 802 or to hold instrumentation. For example, the ports 814 may be used to inject a rinsing or washing agent during a maintenance cycle. The ports 814 may also be used to inject a treatment agent to treat the fluid stream or component thereof. The ports 814 may also be used to install and service an anode. The ports 814 may also facilitate installation of sensors, transmitters, or other devices on the tank 802. The ports 814 may be used as an inspection port or as a sample port. The ports 814 may be used for other operations or effects.

In the illustrated embodiment, the tank 802 also includes a mounting structure 816. In the illustrated embodiment, the mounting structure 816 is a platform-style mounting structure. Other arrangements or geometries of the mounting structure 816 are also contemplated. The mounting structure 816 provides a physical mounting location to mount components to the tank 802. For example, the mounting structure 816 may provide a mounting location for a pipe rack, ladder, and deck structure, conduit, pipe, hose, pump, support element, sensor, auger, vibrator, motor, or other device or structure. In the illustrated embodiment, a single mounting structure 814 is shown. Additional mounting structures 814 may also be coupled to the tank 802.

The illustrated embodiment of the tank 802 also includes a body flange 818. In some embodiments, the body flange 818 is a location on the tank at which a top piece 808 and a bottom piece 809 are joined. In some situations, the ability to separate the tank 802 at the coupling 818 allows for installation, removal, transport, maintenance, and the like for the tank 802 and components disposed external and disposed internal to the tank 802. The body flange 818 may include bolts, nuts, clamps, mounting holes, or the like.

The illustrated embodiment of the system 800 also includes a liquid stream inlet 820. The liquid stream inlet 820 provides fluid communication to the interior of the tank 802 to facilitate supply of a fluid stream into the tank 802. In the illustrated embodiment, the liquid stream inlet 820 enters the tank 802 disposed horizontally. The liquid stream inlet 820 may also be disposed at a non-horizontal angle. Similar to the outlet 810 described above, the liquid stream inlet 820 may include any of a wide range of connection mechanisms. In the illustrated embodiment, the liquid stream inlet 820 is located some distance from the bottom of the tank 802. The liquid stream inlet 820 may also be disposed in the top piece 808 of the tank 802.

In the illustrated embodiment, the system 800 includes a heavy waste outlet 822. The heavy waste outlet 822 is an extraction point for removing heavy waste that has been separated from the liquid stream and collected at the bottom of the tank 802. The heavy waste outlet 822 may include a valve which may be operated manually or by an automated process.

Figure 20:
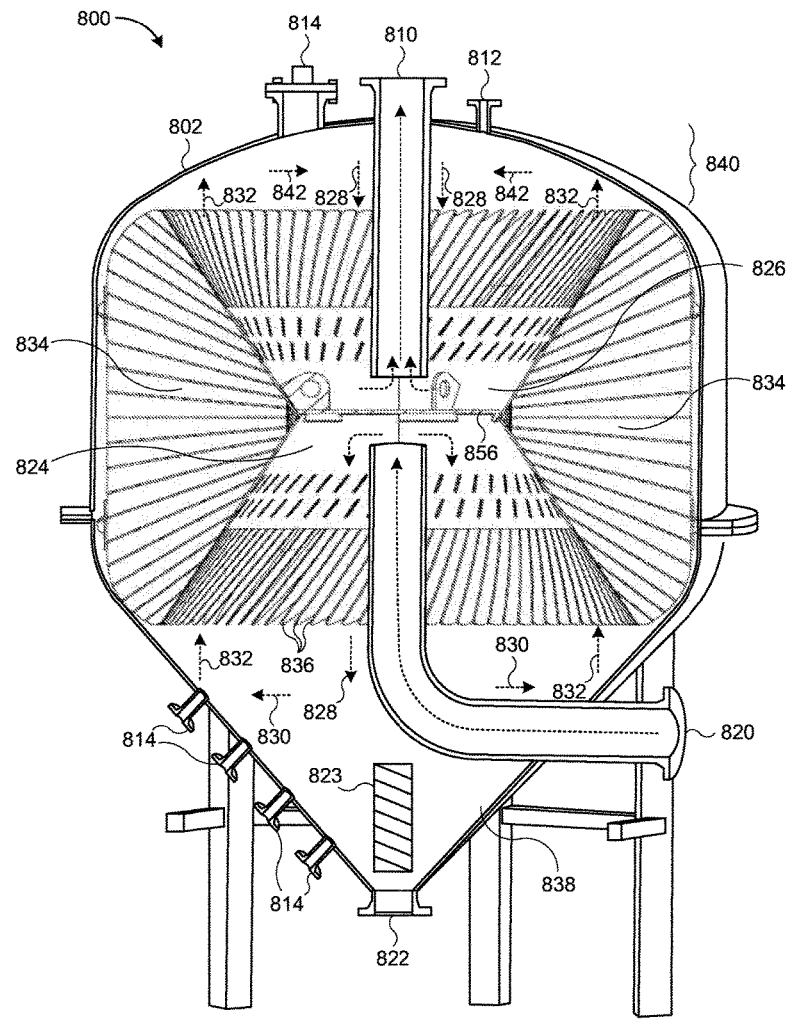
FIG. 20 is a cross-sectional view of the system of FIG. 19, according to one embodiment.

FIG. 20 is a cross-sectional view of the system 800 of FIG. 19, according to one embodiment. The illustrated embodiment includes an hourglass double cone structure consisting of a first flow chamber 824 and a second flow chamber 826. A solid divider 856 which is a plate that divides the two chambers. In the illustrated embodiment, the liquid stream inlet 820 extends into the first flow chamber 824. In this arrangement, the liquid stream flows into the liquid stream inlet 820 and up into the first flow chamber 824. The liquid stream hits the divider 856 at the top of the first flow chamber 824 then reverses the flow of the liquid stream to a gravitationally downward or first direction 828. The liquid stream is then directed in a radially outward or third direction 830 and an upward or second direction 832 to the inclined plate region 834.

The circular shape of the plate pack 812 facilitates an efficient fit within the apparatus 800. A portion of the heavier waste falls out before the liquid stream 807 encounters the plates of the plate pack 812. This reduces the chance of waste clogging the plate pack 812. The plate pack 812 has a plate spacing which results in a higher surface area efficiency with a reduced footprint of the apparatus 800. The laminar flow condition forms boundary conditions next to the surface of each of the plates of the plate pack 812. The boundary condition is a zero-velocity flow which captures and separates waste from the laminar liquid stream 809. Additionally, the radially extending helical geometry of the plate pack 812 creates a raking effect which directs waste to an outer edge of the plate pack 812 which removes wasted from the main flow path and further facilitates separation of the waste from the laminar liquid stream and reduces the chance of re-entrainment of the waste once separated. Furthermore, the radial aspect of the plate pack 812 results in the plate spacing increasing as the plate pack 812 extends radially outward from the cone structure 808. This increasing diameter of the vessel towards the outside of the plate 812 causes an additional drop in flow velocity further increasing separation efficient of the plate pack 812. In one example, the plate pack 812 includes two-hundred or more or less than two-hundred plates.

In the illustrated embodiment, the hourglass double cone structure includes attachment structures disposed within the second flow chamber 826. In the illustrated embodiment, the attachment structures are eyelets. The attachment structures may facilitate hoisting of the inclined plate region 834 and the hourglass double cone structure into or out of the tank 802. The attachment structures may facilitate stabilization of the liquid stream outlet 810 or provide other functionality. Other attachment structures may be used to support the plate pack 834 in the tank 802. These other structures could attach either the top or the bottom of the hourglass double cone to the tank 802 wall to support the plate pack 834 inside the tank 802.

In the illustrated embodiment, the inclined plate region 834 includes a plurality of included plates 836. The inclined plates 836 extend outward from the hourglass double cone structure at both the first flow chamber 824 and the second flow chamber 826. The slope of the inclined plates 836 may be between about 20° and about 70°. In some specific embodiments, the slope of the include plates 836 is approximately 55°. The inclined plates 836 may be electrostatically charged to facilitate removal of waste from the liquid stream. The inclined plate region 834 is an annulus surrounding and extending radially out from the hourglass double cone structure at both the first flow chamber 824 and the second flow chamber 826.

A second velocity of the liquid stream through the inclined plate region 834 measured at the bottom of the lower hourglass shaped double cone is approximately one-half (½) of a first velocity of the liquid stream exiting the liquid stream inlet 820 into the first flow chamber 824. The velocity continues to decrease to as little as ⅓ of the first velocity as the liquid stream approaches the narrow part of the hourglass double cones and then increases back to the second velocity at the top of the hourglass double cone. The reduction in flow velocity facilitates separation of waste from the liquid carrier in the liquid stream. This separation is due to a reduced level of turbulence resulting in less lateral mixing within the liquid stream.

The inclined plates 836 form a laminar flow condition in the liquid stream. The laminar flow condition causes fallout of heavy waste having a specific gravity greater than the liquid carrier of the liquid stream. The separated heavy waste collects in the lower collection portion 838. The laminar flow of the liquid stream also facilitates the separation of light waste having a specific gravity lower than that of the liquid carrier within the liquid stream. The light waste may include oils and other fluids and/or suspended fine particulates. Gasses may also be drawn out of the fluid during laminar flow across the inclined plates 836.

Light waste is collected in an upper collection region 840. In the illustrated embodiment, the upper collection portion 840 is positioned at a natural collection area for buoyant material within the tank 802. As the light waste collects in the upper collection portion 840 of the tank 802, the light waste may be removed from the upper collection portion 840 through the light waste outlet 812 by a pump or by the system pressure.

In the illustrated embodiment, the inclined plates 836 are coupled to an exterior of the first flow chamber 824 and the second flow chamber 826 via a tab-and-slot coupling mechanism. Other manners of coupling the inclined plates 836 to the first and second flow chambers 824 and 826, such as via a weld, adhesive, bonding, or other coupling mechanisms, may also be used.

In the illustrated embodiment, the liquid stream continues out of the inclined plate region 834 in an upward direction 832 and then passes radially inward 842 over the weir of the top hourglass double cone and downward 828 into the second flow chamber 826. The second flow chamber 826 directs the liquid stream into the liquid stream outlet 810 where it is extracted from the tank 802 by a pump or by the system pressure.

In the illustrated embodiment, the geometry of the first and second flow chambers 824 and 826 are identical and mirrored. In other embodiments, the geometry of the first flow chamber 824 varies from the geometry of the second flow chamber. The slope of the walls of at least one of the first flow chamber 824 and the second flow chamber 826 is approximately 45° to 70° relative to the horizontal. Other slopes and arrangements may also be included.

In the illustrated embodiment, the system 800 also includes ports 814 disposed on the tank 802 at a lower collection portion 838 of the tank 802. The ports 814 can have multiple purposes, such as for mounting instruments, sensors, transmitters, for taking samples or to inject chemicals. In the illustrated embodiment of FIG. 20, the ports 814 are aligned vertically relative to one another. At least one of the ports 814 may also be offset from another.

The heavy waste outlet 822 facilitates extraction of collected heavy waste from the tank 802. The heavy waste can be carried away from tank 802 by a pump, auger, conveyor, or similar device.

Figure 21:
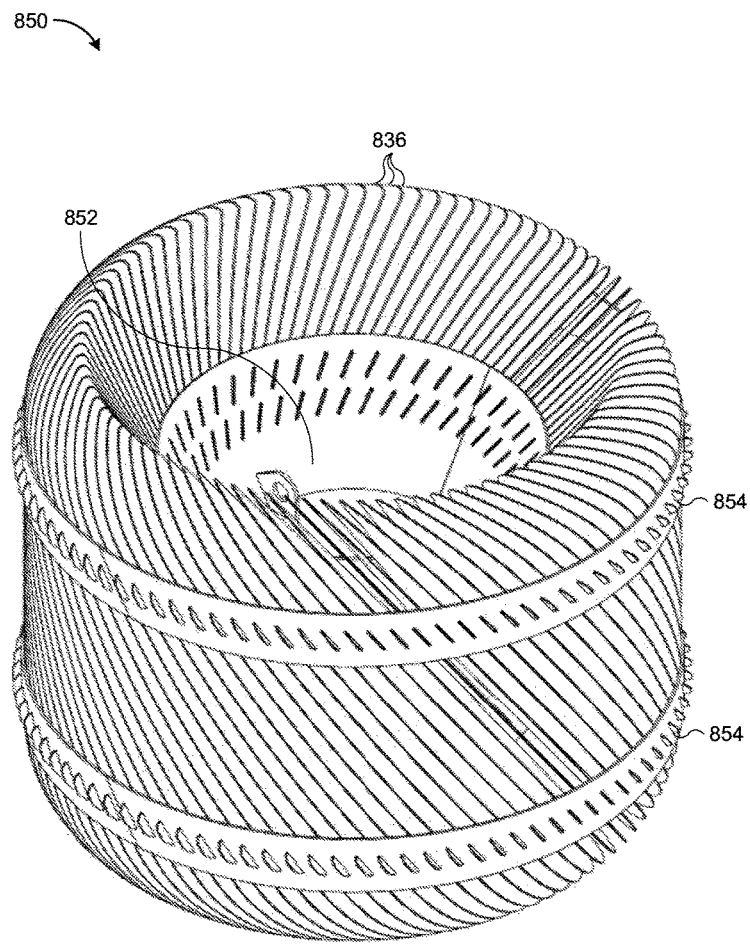
FIG. 21 is a perspective view of the inclined plate pack of FIG. 20, according to one embodiment.

FIG. 21 is a perspective view of an inclined plate pack 850 from FIG. 20, according to one embodiment. In the illustrated embodiment, one possible arrangement of the inclined plates 836 is shown. In the illustrated embodiment, the inclined plates 836 form a helical pattern extending radially outward from an hourglass double cone structure 852.

The radially extending helical pattern of the inclined plates 836 creates a longer travel path and a laminar flow pattern to reduce lateral mixing present in turbulent flow to improve separation of light waste and so the heavy waste can fall out of the liquid stream and settle downward into the lower collection portion described above. Additionally, the single plate pack 850 provides improved surface area efficiency which is more efficient than two separate plate packs having the same surface area split into two separate plate packs. Specifically, the illustrated embodiment of the plate pack 850 maintains laminar flow across the entire inclined plate pack 850 while a dual plate pack system would trip the flow causing turbulent loss of laminar flow between the separate packs. This disruption in the laminar flow would require additional surface area to re-establish the laminar condition.

In the illustrated embodiment, the inclined plate pack 850 is bound and stabilized on the outside with bands 854. In the illustrated embodiment, tabs extend through slots in the bands 854 which are then bent over to lock them in. The inside of the plate pack 850 is bound and stabilized on the inside by attaching to the slots in hourglass double cone structure 852. Tabs on the plates fit into the slots which are either bent over or welded on the inside. The combination of the hourglass double cone structure 852 and the outside bands 854 form a strong and stable structure that can support the plate pack 850. The bands 854 can be coupled to the inclined plates 836 by any of a variety of coupling schemes. The inclined plates 836 can be coupled to the hourglass double cone structure 852 by any of a variety of coupling schemes. While a pair of bands 854 are shown, some embodiments include fewer or more than two bands 854.

In the illustrated embodiment, the ends of the inclined plates 836 are curved and rounded to follow the geometry of the interior of the tank 802 of FIG. 20. The inclined plates 836 may also include other geometries. For example, the inclined plate pack 850 may be more cylindrical without curved edges. While the inclined plates 836 are shown as having a uniform geometry, the inclined plates 836 may also be non-uniform. In other words, one or more plates 836 may be different in geometry from another or one of the cones in the hourglass cone structure 852 can have a different shape or angle slope. Other arrangements and geometries are also contemplated.

Figure 22:
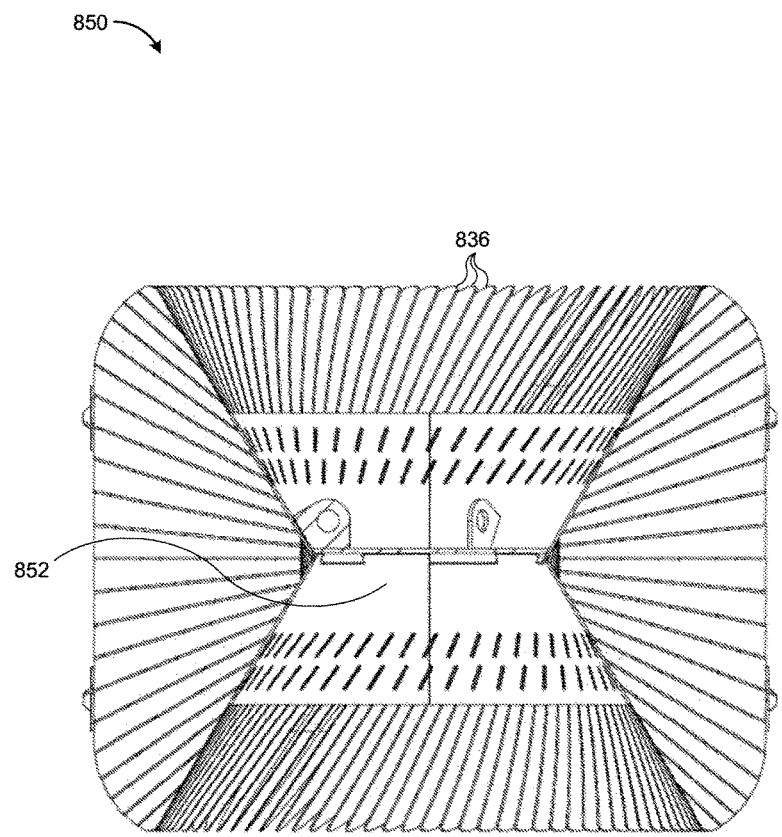
FIG. 22 is a cross-sectional view of the inclined plate pack of FIG. 21, according to one embodiment.

FIG. 22 is a cross-sectional view of the inclined plate pack 850 of FIG. 21, according to one embodiment. In the illustrated embodiment, the hourglass double cone structure 852 is disposed centrally within the inclined plates 836 of the inclined plate pack 850.

Figure 23:
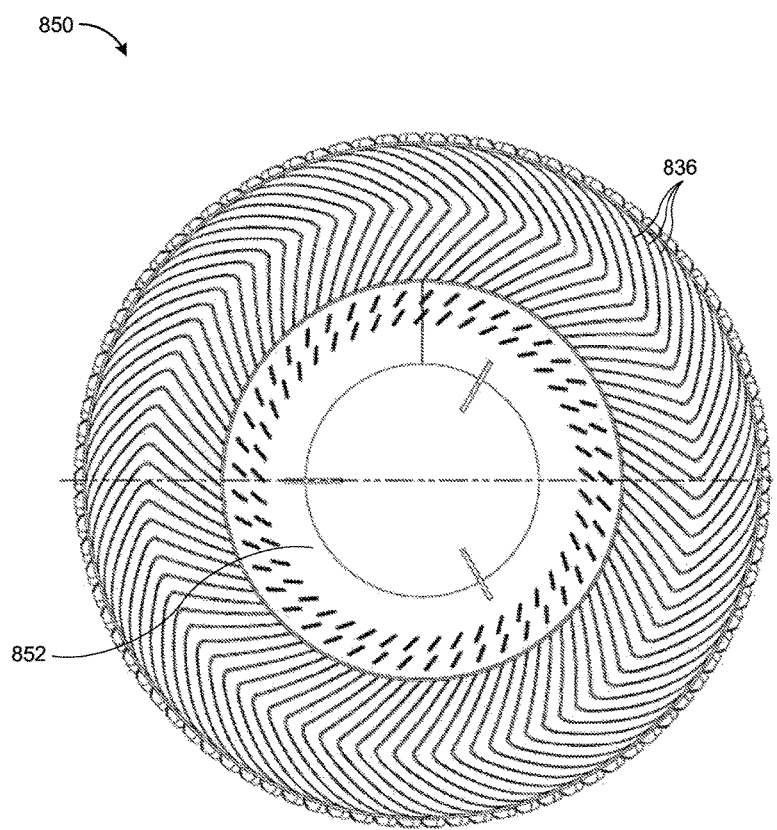
FIG. 23 is a top view of the inclined plate pack of FIG. 21, according to one embodiment.

FIG. 23 is a top view of the inclined plate pack 850 of FIG. 21, according to one embodiment. In the illustrated embodiment, the hourglass double cone structure 852 is disposed centrally within the inclined plate pack 850. The inclined plates 836 are shown as extending radially from the hourglass double cone structure 852. In the illustrated embodiment, the inclined plates 836 have a clockwise helical rotation. In other embodiments, the helical rotation is counter-clockwise. In the illustrated embodiment, the inclined plates 836 have a simple helical geometry. The geometry of the inclined plates 836 may be a more complex geometry such as a helical pattern that flattens out at one end of the inclined plates 836 or the inside edge of the inclined plates 836 above or below the hourglass double cone structure 852 could extend past the edge of the hourglass double cone structure 852 into flow chamber 824 and/or 826. The inclined plates 836 may have a slight bend in them to provide rigidity for the inclined plates 836.

Figure 24:
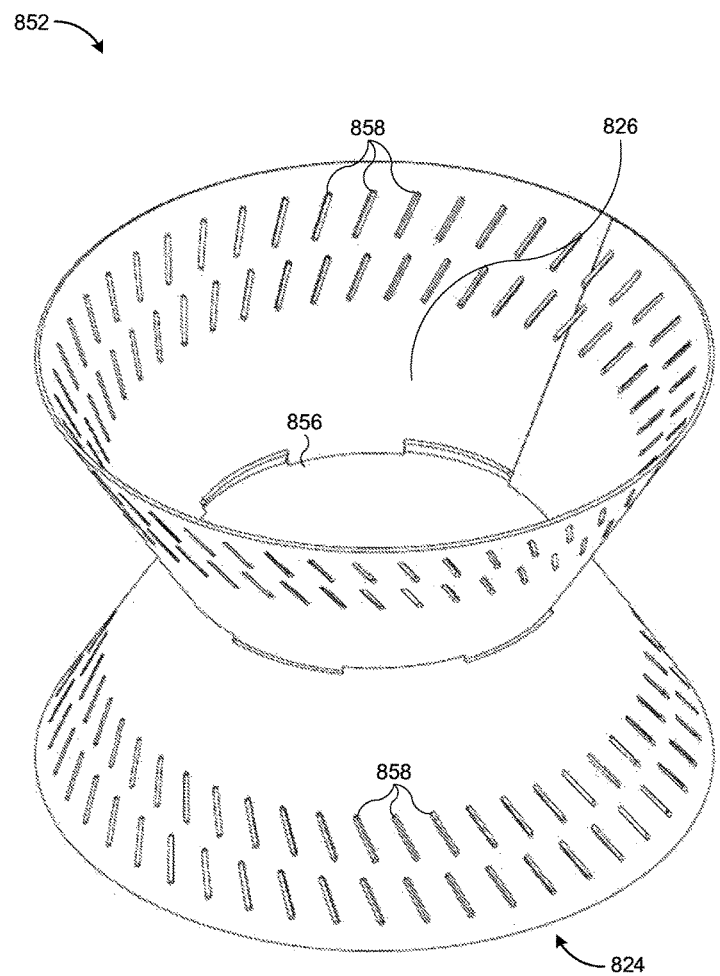
FIG. 24 is a perspective view of an hourglass double cone structure, according to one embodiment.

FIG. 24 is a perspective view of an hourglass double cone structure 852, according to one embodiment. The illustrated embodiment depicts the first flow chamber 824 on an interior of a gravitationally downward facing portion of the hourglass double cone structure 852. The illustrated embodiment also includes the second flow chamber 826 on an interior of a gravitationally upward facing portion of the hourglass double cone structure 852.

The illustrated embodiment of the hourglass double cone structure 852 includes a divider 856. The divider 856 separates the first flow chamber 824 from the second flow chamber 826 where they meet. Basically, the divider 856 forms outwardly facing conical cups which are the first flow chamber 824 and the second flow chamber 826.

The divider 856 may be a unified portion of one or both of the first flow chamber 824 and the second flow chamber 826 or the divider 856 may be a separate structure coupled to one or both of the first and second flow chambers 824 and 826. The first and second flow chambers 824 and 826 may be unified portions of the hourglass double cone structure 852 or the first and second flow chamber 824 and 826 may be separate structures coupled together to form the hourglass double cone structure 852.

In the illustrated embodiment, slots 858 are formed on the hourglass double cone structure 852 at both the first and second flow chambers 824 and 826. The slots 858 facilitate attachment of inclined plates (i.e. inclined plates 836 of FIG. 23) to the hourglass double cone structure 852. While the slots 858 are shown as narrows gaps in the material, they may also be tabs, welds, adhesive sites, bolts, or other attachments to facilitate coupling of inclined plates or other structures to the hourglass double cone structure 852.

Figure 25:
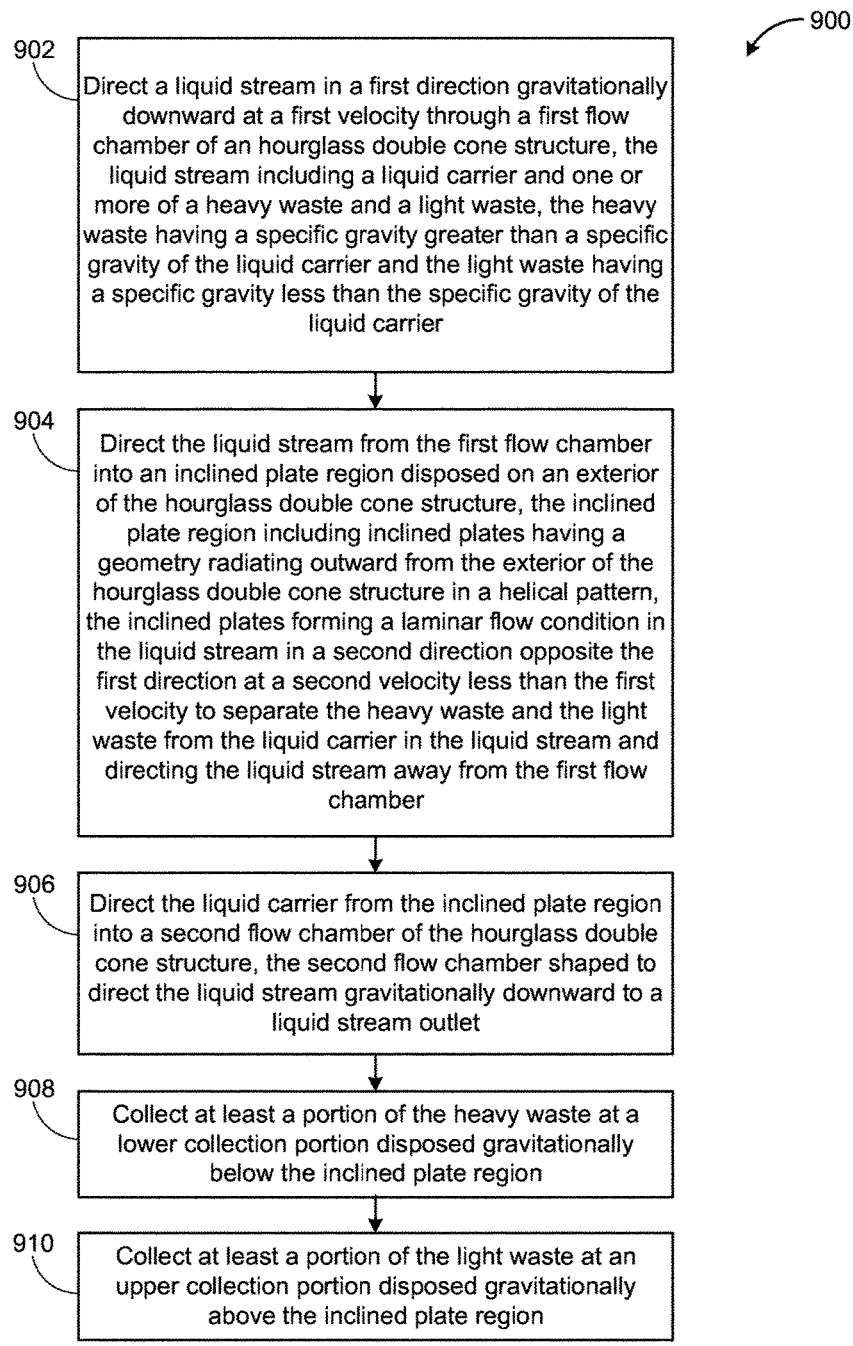
FIG. 25 is a schematic flow chart diagram of a method for removing waste from a liquid stream, according to one embodiment.

FIG. 25 is a schematic flow chart diagram of a method 900 for removing waste from a liquid stream, according to one embodiment. In the illustrated embodiment, the method 900, at block 902, includes directing a liquid stream in a first direction gravitationally downward direction at a first velocity through a first flow chamber of an hourglass double cone structure. The liquid stream includes a liquid carrier and one or more of a heavy waste and a light waste. The heavy waste has a specific gravity greater than a specific gravity of the liquid carrier and a light waste having a specific gravity less than the specific gravity of the liquid carrier.

At block 904, the method 900 includes directing the liquid stream from the first flow chamber into an inclined plate region disposed on an exterior of the hourglass double cone structure. The inclined plate region includes inclined plates having a geometry radiating outward from the exterior of the hourglass double cone structure in a helical pattern. The inclined plates form a laminar flow condition in the liquid stream in a second direction opposite the first direction at a second velocity less than the first velocity to separate the heavy waste and the light waste from the liquid carrier in the liquid stream and directing the liquid stream away from the first flow chamber.

At block 906, the method 900 includes directing the liquid carrier from the inclined plate region into a second flow chamber of the hourglass double cone structure. The second flow chamber is shaped to direct the liquid stream gravitationally downward to a liquid stream outlet.

At block 908, the method 900 includes collecting at least a portion of the heavy waste at a lower collection portion disposed gravitationally below the inclined plate region. At block 910, the method 900 includes collecting at least a portion of the light waste at an upper collection portion disposed gravitationally above the inclined plate region.

In the above description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C; or some other suitable combination. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The subject matter of the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus for refining a liquid stream, the apparatus comprising:
   an hourglass double cone structure comprising a first flow chamber and a second flow chamber, the first flow chamber being below the second flow chamber, wherein the first flow chamber is shaped to direct the liquid stream from a liquid stream inlet gravitationally downward in a first direction at a first velocity, and wherein the liquid stream comprises a liquid carrier with at least one of a heavy waste having a specific gravity greater than a specific gravity of the liquid carrier and a light waste having a specific gravity less than the specific gravity of the liquid carrier; and
   an inclined plate region disposed on an exterior of the hourglass double cone structure, the inclined plate region comprising inclined plates having a geometry radiating outward from the hourglass double cone structure in a helical pattern, wherein the geometry of the inclined plate region directs the liquid carrier upwards in a second direction opposite the first direction at a second velocity less than the first velocity forming a laminar flow condition in the liquid stream to separate the heavy waste to a lower collection portion and the light waste to an upper collection portion of the apparatus;
   wherein the second flow chamber is shaped to direct the liquid stream to a liquid stream outlet.

2. The apparatus of claim 1, wherein:
   the inclined plates define inclined channels fluidly coupling an outlet of the first flow chamber and an inlet of the second flow chamber; and
   the liquid carrier flows into the inclined channels in a third direction perpendicular to the first and second directions and out of the inclined channels in a fourth direction opposite the third direction.

3. The apparatus of claim 2, wherein:
   the third direction is radially outward; and
   the fourth direction is radially inward.

4. The apparatus of claim 3, wherein:
   the inclined plates are circumferentially spaced apart in an annular formation;
   the annular formation of the inclined plates is positioned proximate, and substantially concentric with, an outlet of the first flow chamber and an inlet of the second flow chamber.

5. The apparatus of claim 1, wherein the liquid stream does not require the use of flocculants to achieve refinement.

6. The apparatus of claim 1, wherein the slope of at least one of the first flow chamber and the second flow chamber relative to the horizontal is between about 45 to 70 degrees.

7. The apparatus of claim 1, wherein a slope of the inclined plates is between about 20 degrees and about 70 degrees.

8. The apparatus of claim 1, wherein the plates have a geometry to apply a raking effect to push waste radially outward on the plates.

9. The apparatus of claim 1, wherein the inclined plates are electrostatically charged.

10. The apparatus of claim 1, further comprising a motivating device.

11. The apparatus of claim 1, wherein a cross-sectional area of the inclined plate region is larger than a cross-sectional area of the first flow chamber.

12. The apparatus of claim 1, wherein the first velocity will range from about 1.5 to about 3 times more than the second velocity as the liquid fluid goes through the plate pack.

13. The apparatus of claim 1, wherein the first flow chamber, the inclined plate region, and the second flow chamber are free of moving parts.

14. The apparatus of claim 1, wherein the first flow chamber, the inclined plate region, and the second flow chamber are free of interchangeable media.

15. The apparatus of claim 1, further comprising a liquid stream supply line oriented within the first flow chamber to direct the liquid stream gravitationally upward into the first flow chamber opposite the first direction.

16. A method comprising:
    directing a liquid stream from a liquid stream inlet in a first direction gravitationally downward at a first velocity through a first flow chamber of an hourglass double cone structure, the liquid stream comprising a liquid carrier and one or more of a heavy waste and a light waste, the heavy waste having a specific gravity greater than a specific gravity of the liquid carrier and the light waste having a specific gravity less than the specific gravity of the liquid carrier;
    directing the liquid stream from the first flow chamber into an inclined plate region disposed on an exterior of the hourglass double cone structure, the inclined plate region comprising inclined plates having a geometry radiating outward from the exterior of the hourglass double cone structure in a helical pattern, the inclined plates forming a laminar flow condition in the liquid stream in a second direction opposite the first direction at a second velocity less than the first velocity to separate the heavy waste and the light waste from the liquid carrier in the liquid stream and directing the liquid stream away from the first flow chamber;

directing the liquid carrier from the inclined plate region into a second flow chamber of the hourglass double cone structure, the second flow chamber shaped to direct the liquid stream gravitationally downward to a liquid stream outlet;

collecting at least a portion of the heavy waste at a lower collection portion disposed gravitationally below the inclined plate region; and collecting at least a portion of the light waste at an upper collection portion disposed gravitationally above the inclined plate region.

17. The method of claim 16, further comprising transitioning the liquid stream from the outlet of the first flow chamber to an inlet of the second flow chamber via inclined channels defined by the inclined plates.

18. The method of claim 16, wherein the liquid stream transitions from the first flow chamber to the inclined plate region by moving in a third direction and transitions from the inclined plate region to the second flow chamber by moving in a fourth direction.

19. The method of claim 18, wherein:

the inclined plate region is an annulus formed around and extending from the hourglass double cone structure;

the third direction is radially outward; and the fourth direction is radially inward.

20. A system for refining a liquid stream, the system comprising:

an hourglass double cone structure comprising a first flow chamber and a second flow chamber, the first flow chamber being below the second flow chamber, wherein the first flow chamber opens downward and is shaped to direct the liquid stream from a liquid stream inlet gravitationally downward in a first direction at a first velocity, wherein the liquid stream comprising a liquid carrier with at least one of a heavy waste having a specific gravity greater than a specific gravity of the liquid carrier and a light waste having a specific gravity less than the specific gravity of the liquid carrier;

an inclined plate region exterior to the hourglass double cone structure, the inclined plate region comprising inclined plates having a geometry radiating outward from the hourglass double cone structure in a helical pattern, wherein the geometry of the inclined plate region directs the liquid carrier upwards in a second direction opposite the first direction at a second velocity less than the first velocity forming a laminar flow condition in the liquid stream to separate the heavy waste to a lower collection portion and the light waste to an upper collection portion of the system;

a heavy waste outlet to facilitate removal of the heavy waste from the lower collection portion of the system; and a light waste outlet to facilitate removal of the light waste from the upper collection portion of the system;

wherein the second flow chamber opens upward and is shaped to direct the liquid stream to a liquid stream outlet, the second flow chamber being separated from the first flow chamber by a divider.

* * * * *